United States Patent
Miyazawa et al.

(10) Patent No.: US 11,325,287 B2
(45) Date of Patent: May 10, 2022

(54) SHAPING MATERIAL, RESIN SHAPED PRODUCT, COSMETIC CONTAINER, SEMICONDUCTOR CONTAINER, AND METHOD OF PRODUCING SEMICONDUCTOR CONTAINER

(71) Applicant: ZEON CORPORATION, Tokyo (JP)

(72) Inventors: Shinsuke Miyazawa, Tokyo (JP); Satoshi Yamada, Tokyo (JP); Ayako Kato, Tokyo (JP); Eito Ariura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 287 days.

(21) Appl. No.: 16/484,587

(22) PCT Filed: Mar. 19, 2018

(86) PCT No.: PCT/JP2018/010903
§ 371 (c)(1),
(2) Date: Aug. 8, 2019

(87) PCT Pub. No.: WO2018/174029
PCT Pub. Date: Sep. 27, 2018

(65) Prior Publication Data
US 2020/0269477 A1    Aug. 27, 2020

(30) Foreign Application Priority Data

Mar. 21, 2017 (JP) .............................. JP2017-054948
Mar. 23, 2017 (JP) .............................. JP2017-057534
Sep. 29, 2017 (JP) .............................. JP2017-190293

(51) Int. Cl.
*B29C 45/00*    (2006.01)
*B29C 45/26*    (2006.01)
*C08G 61/08*    (2006.01)

(52) U.S. Cl.
CPC ...... *B29C 45/0055* (2013.01); *B29C 45/0001* (2013.01); *B29C 45/26* (2013.01); *C08G 61/08* (2013.01)

(58) Field of Classification Search
None
See application file for complete search history.

(56) References Cited

U.S. PATENT DOCUMENTS

| | | | |
|---|---|---|---|
| 6,544,610 B1 * | 4/2003 | Minami | B32B 27/08 428/35.7 |
| 6,682,797 B1 | 1/2004 | Otoi et al. | |
| 2005/0165139 A1 | 7/2005 | Kawakami et al. | |
| 2010/0092712 A1 | 4/2010 | Ogawa et al. | |
| 2012/0171398 A1 | 7/2012 | Takahashi et al. | |
| 2016/0303830 A1 | 10/2016 | Miyazawa | |
| 2017/0218191 A1 | 8/2017 | Yabuki et al. | |
| 2017/0301473 A1 | 10/2017 | Miyazawa et al. | |
| 2018/0044468 A1 | 2/2018 | Hayano | |
| 2018/0079876 A1 | 3/2018 | Kato et al. | |

FOREIGN PATENT DOCUMENTS

| | | |
|---|---|---|
| CN | 1662584 A | 8/2005 |
| JP | H1174337 A | 3/1999 |
| JP | 2002020464 A | 1/2002 |
| JP | 2002249553 A | 9/2002 |
| JP | 2007016102 A | 1/2007 |
| JP | 2008137671 A | 6/2008 |
| JP | 2011026614 A | 2/2011 |
| JP | 2015054885 A | 3/2015 |
| JP | 2015160399 A | 9/2015 |
| JP | 2016026909 A | 2/2016 |
| TW | 201634518 A | 10/2016 |
| WO | 2012033076 A1 | 3/2012 |

OTHER PUBLICATIONS

Nov. 27, 2020, the Extended European Search Report issued by the European Patent Office in the corresponding European Patent Application No. 18770300.4.
Sep. 24, 2019, International Preliminary Report on Patentability issued in the International Patent Application No. PCT/JP2018/010903.

* cited by examiner

*Primary Examiner* — Fred M Teskin
(74) *Attorney, Agent, or Firm* — Kenja IP Law PC

(57) ABSTRACT

A shaping material contains a crystalline alicyclic structure-containing resin. More specifically, the crystalline alicyclic structure-containing resin in the shaping material has a melting point of 200° C. or higher, and content of chlorobenzene-soluble components in the shaping material is 1,000 ppm or less as an o-dichlorobenzene-equivalent value based on gas chromatography analysis with o-dichlorobenzene as a standard substance.

8 Claims, No Drawings

SHAPING MATERIAL, RESIN SHAPED PRODUCT, COSMETIC CONTAINER, SEMICONDUCTOR CONTAINER, AND METHOD OF PRODUCING SEMICONDUCTOR CONTAINER

TECHNICAL FIELD

The present disclosure relates to a shaping material, a resin shaped product, a cosmetic container, a semiconductor container, and a method of producing a semiconductor container. In particular, the present disclosure relates to a shaping material and so forth containing a crystalline alicyclic structure-containing resin.

BACKGROUND

Crystalline alicyclic structure-containing resins have been attracting attention in recent years as materials for various resin shaped products due to having excellent physical properties such as heat resistance, mechanical strength, and solvent resistance.

In one example, Patent Literature (PTL) 1 describes a polymer composition that contains a crystalline norbornene-based polymer, an amorphous alicyclic structure-containing polymer, and so forth, and also describes medical equipment obtained through shaping of this polymer composition. In this document, coagulation and direct drying are given as examples of purification methods that can be used after production of the crystalline norbornene-based polymer.

Among crystalline alicyclic structure-containing resins, polymers that include a large quantity of repeating units derived from specific monomers such as dicyclopentadiene are known to generally have high melting points.

For example, PTL 2 describes a hydrogenated product of a norbornene-based ring-opened polymer that has a melting point and also describes an injection molded item thereof. PTL 2 also discloses that a hydrogenated dicyclopentadiene ring-opened polymer has a melting point of 272° C.

Moreover, PTL 3 describes a hydrogenated dicyclopentadiene ring-opened polymer having syndiotactic stereoregularity and also describes a crystalline resin composition containing this polymer and a crystal nucleating agent. PTL 3 also discloses that the melting point of an actually obtained hydrogenated dicyclopentadiene ring-opened polymer was 265° C.

PTL 4 discloses that heat shrinkage and the like of a stretched film obtained through stretching of a resin film having a crystalline alicyclic structure-containing resin as a main component can be controlled by bringing the stretched film into contact with a hydrocarbon solvent.

PTL 4 also discloses that when a stretched film having a hydrogenated dicyclopentadiene ring-opened polymer as a main component is immersed in toluene or cyclohexane, a value for the rate of heat shrinkage of the stretched film decreases compared to that of the stretched film prior to immersion.

This indicates that in a situation in which crystallization has proceeded to a certain extent in a resin shaped product containing a crystalline alicyclic structure-containing resin, the inclusion of a hydrocarbon solvent therein can cause rearrangement of polymer chains and allow further progression of crystallization.

In recent years, there have been many attempts to obtain a wide range of shaped products capable of displaying higher performance than conventionally achieved. In one example, PTL 5 describes an injection molded item for medical applications and a blow molded item for medical applications that are obtained by shaping, under specific conditions, a resin composition that contains 70 weight % to 90 weight % of a norbornene-based polymer and 10 weight % to 30 weight % of a block copolymer composed of a hydrogenated styrene-based thermoplastic elastomer. In another example, PTL 6 describes a food container obtained through shaping of a hydrogenated norbornene-based ring-opened polymer that includes a repeating unit derived from 2-norbornene and that has a melting point within a range of 110° C. to 145° C. In yet another example, PTL 7 describes a container for a wafer used in semiconductor production (semiconductor container) wherein at least one of a main body and a lid of the container is formed by a shaped product of a cycloolefin resin.

CITATION LIST

Patent Literature

PTL 1: JP 2011-26614 A
PTL 2: JP 2002-20464 A
PTL 3: JP 2015-54885 A
PTL 4: JP 2016-26909 A
PTL 5: JP 2015-160399 A
PTL 6: JP 2008-137671 A
PTL 7: JP H11-74337 A

SUMMARY

Technical Problem

Demands relating to shaping materials that have excellent formability while also having a high melting point and shaped items that have higher performance than conventionally achieved have been increasing in recent years. However, the various resins disclosed in PTL 1 to 7 have not been able to satisfy this need.

Accordingly, an objective of the present disclosure is to provide a shaping material that contains a high-melting point resin and has excellent formability, and also to provide a resin shaped product, a cosmetic container, and a semiconductor container that are obtained through shaping of this shaping material.

In particular, cosmetic containers are normally required to be hygienic and have excellent safety and stability such that elution of components of the container does not occur even while in contact with contents of the container. In addition, the development of containers having complicated structures, low-capacity containers, and so forth in recent years has made it necessary for shaping material used in production of cosmetic containers to have excellent formability. However, the various resins disclosed in PTL 1 to 7 have not been able to satisfy this need.

Accordingly, another objective of the present disclosure is to provide a cosmetic container having excellent performance.

Furthermore, in recent years, it has become desirable to provide even faster production processes for semiconductor devices from a viewpoint of improving production yield. For this reason, a semiconductor container (FOUP: Front Opening Unified Pod) that is used to transfer a semiconductor wafer in a semiconductor production process is required to be able to house the semiconductor wafer after heating thereof in the production process, even without providing cooling time for the semiconductor wafer. However, the various resins disclosed in PTL 1 to 7 have not been able to satisfy this need. Note that a FOUP is a front opening cassette unified box for transport and storage defined by "SEMI Standard E47.1".

Accordingly, another objective of the present disclosure is to provide a semiconductor container having high heat resistance and also to provide a method of producing a semiconductor container that enables good production of this semiconductor container.

Solution to Problem

The present disclosure aims to advantageously solve the problems set forth above by disclosing a shaping material comprising a crystalline alicyclic structure-containing resin, wherein the crystalline alicyclic structure-containing resin has a melting point of 200° C. or higher, and content of chlorobenzene-soluble components in the shaping material is 1,000 ppm or less as an o-dichlorobenzene-equivalent value based on gas chromatography analysis with o-dichlorobenzene as a standard substance. A shaping material that contains a crystalline alicyclic structure-containing resin having a melting point of 200° C. or higher and in which the content of chlorobenzene-soluble components is 1,000 ppm or less as set forth above has excellent formability despite containing a high-melting point resin.

The "melting point of a crystalline alicyclic structure-containing resin" can be measured by differential scanning calorimetry in accordance with JIS K7121. Moreover, the "content of chlorobenzene-soluble components in a shaping material" can be measured by a method described in the EXAMPLES section.

In the presently disclosed shaping material, the crystalline alicyclic structure-containing resin is preferably a hydrogenated dicyclopentadiene ring-opened polymer. When the crystalline alicyclic structure-containing resin is a hydrogenated dicyclopentadiene ring-opened polymer, it is possible to further improve heat resistance and chemical resistance of the shaping material and of a shaped product or the like obtained using the shaping material.

The presently disclosed shaping material can suitably be used in injection molding. Use of the presently disclosed shaping material in injection molding enables stable production a resin shaped product in which crystallization has sufficiently progressed.

A presently disclosed resin shaped product that can advantageously solve the problems set forth above is obtained through melt shaping of any one of the shaping materials set forth above.

The presently disclosed shaping material has excellent crystallinity and is suitable for melt shaping because it rapidly crystallizes upon cooling from a molten state. Moreover, a resin shaped product having excellent mechanical strength can be obtained through melt shaping of the presently disclosed shaping material. Furthermore, a cosmetic container and a semiconductor container having excellent attributes can suitably be produced through any one of the shaping materials set forth above.

In particular, a presently disclosed semiconductor container preferably has a degree of crystallinity of 10% or more. A semiconductor container having a degree of crystallinity of 10% or more has excellent chemical resistance. Note that the "degree of crystallinity" can be measured using an X-ray diffractometer.

Moreover, the present disclosure aims to advantageously solve the problems set forth above by disclosing a method of producing a semiconductor container comprising: a purification step of holding a target resin including a crystalline alicyclic structure-containing resin having a melting point Tm (° C.) of 200° C. or higher in a purification temperature range of not lower than 140° C. and not higher than 300° C. for not less than 0.5 hours and not more than 100 hours to obtain a purified target resin; and a shaping step of heating a pre-crystallization shaping material including the purified target resin to a higher temperature than the melting point Tm (° C.) to melt the pre-crystallization shaping material and subsequently shaping the pre-crystallization shaping material while holding the pre-crystallization shaping material in a crystallization temperature range of not lower than (Tm−140°) C. and lower than the melting point Tm (° C.) to cause crystallization. The method of producing a semiconductor container including the production steps set forth above enables good production of a semiconductor container having high heat resistance.

In the presently disclosed method of producing a semiconductor container, content of chlorobenzene-soluble components in the pre-crystallization shaping material used in the shaping step is preferably 1,000 ppm or less as an o-dichlorobenzene-equivalent value based on gas chromatography analysis with o-dichlorobenzene as a standard substance.

When the content of chlorobenzene-soluble components in the pre-crystallization shaping material is 1,000 ppm or less, it is possible to efficiently produce a semiconductor container for which the amount of evolved outgas is small.

Advantageous Effect

According to the present disclosure, it is possible to provide a shaping material that contains a high-melting point resin and has excellent formability.

Moreover, according to the present disclosure, it is possible to provide a resin shaped product, a cosmetic container, and a semiconductor container that are obtained through shaping of a shaping material that contains a high-melting point resin and has excellent formability.

Furthermore, according to the present disclosure, it is possible to provide a method of producing the aforementioned semiconductor container.

DETAILED DESCRIPTION

The presently disclosed shaping material can suitably be used to produce the presently disclosed resin shaped product, cosmetic container, and semiconductor container. Moreover, the presently disclosed cosmetic container can suitably be used as a container for holding cosmetics of various properties and forms. Furthermore, the presently disclosed semiconductor container can suitably be used to hold a semiconductor material, such as a semiconductor wafer, that can be used in production of a semiconductor device. Also, the presently disclosed semiconductor container can favorably be produced using the presently disclosed method of producing a semiconductor container.

The following provides a detailed description of the present disclosure that is divided into sections relating to 1) a shaping material, 2) a resin shaped product, 3) a cosmetic container, 4) a semiconductor container, and 5) a method of producing a semiconductor container.

1) Shaping Material

The presently disclosed shaping material is a shaping material that contains a crystalline alicyclic structure-containing resin. Features of the presently disclosed shaping material are that the crystalline alicyclic structure-containing resin has a melting point of 200° C. or higher, and content of chlorobenzene-soluble components in the shaping material is 1,000 ppm or less as an o-dichlorobenzene-equivalent value based on gas chromatography analysis with o-dichlorobenzene as a standard substance.

(Crystalline Alicyclic Structure-Containing Resin)

The crystalline alicyclic structure-containing resin is a polymer that is obtained through polymerization of a cycloolefin, that has an alicyclic structure in molecules thereof, and that displays crystallinity. In the following description, the crystalline alicyclic structure-containing resin is also referred to simply as "polymer (a)". When a polymer is said to "display crystallinity" in the present specification, this means that a melting point is detected when the polymer is measured by differential scanning calorimetry (DSC) in accordance with JIS K7121. Note that the "crystallinity" of the polymer is a characteristic property of a polymer having a specific structure that may be brought about by stereoregularity of polymer chains.

—Polymer (α)—

The polymer (α) is not specifically limited and may, for example, be a hydrogenated product of a norbornene-based ring-opened polymer. More specifically, the polymer (α) may be a commonly known polymer such as a hydrogenated dicyclopentadiene ring-opened polymer having syndiotactic stereoregularity that is described in WO 2012/033076 A1, a hydrogenated dicyclopentadiene ring-opened polymer having isotactic stereoregularity that is described in JP 2002-249553 A, or a hydrogenated norbornene ring-opened polymer that is described in JP 2007-16102 A.

The melting point of the polymer (α) is required to be 200° C. or higher, is preferably 220° C. or higher, and is preferably 350° C. or lower, more preferably 320° C. or lower, and even more preferably 300° C. or lower. A shaping material containing a polymer (α) that has a melting point within any of the ranges set forth above has good formability. Moreover, it is easy to obtain a resin shaped product, a cosmetic container, a semiconductor container, and the like (hereinafter, also referred to as a "resin shaped product and the like") having excellent properties using this shaping material.

In particular, the polymer (α) is preferably a hydrogenated dicyclopentadiene ring-opened polymer having syndiotactic stereoregularity (hereinafter, also referred to as "polymer (α1)") because this makes it easy to obtain a resin shaped product and the like having high heat resistance and chemical resistance. The hydrogenated dicyclopentadiene ring-opened polymer is a hydrogenated product of a ring-opened polymer including a monomer unit derived from a dicyclopentadiene. The percentage content of the monomer unit derived from the dicyclopentadiene in the hydrogenated dicyclopentadiene ring-opened polymer when the entire hydrogenated dicyclopentadiene ring-opened polymer is taken to be 100 mass % is preferably more than 90 mass %, and more preferably more than 95 mass %.

Although no specific limitations are placed on the degree of stereoregularity of the polymer (α1), it is preferable that the polymer (α1) has a high degree of stereoregularity because this makes it easy to obtain a resin shaped product having various excellent properties, and, more specifically, to obtain a cosmetic container having excellent water resistance, chemical resistance, and ease of wiping off oil content and a semiconductor container having high heat resistance and chemical resistance.

Specifically, for repeating units obtained by performing ring-opening polymerization of dicyclopentadiene to obtain a ring-opened polymer and then performing hydrogenation of the ring-opened polymer, the proportion of racemo diads is preferably 51% or more, more preferably 60% or more, and particularly preferably 65% or more.

A higher proportion of racemo diads, and thus a higher degree of syndiotactic stereoregularity means that a hydrogenated dicyclopentadiene ring-opened polymer having a higher melting point is obtained.

The proportion of racemo diads can be determined based on $^{13}$C-NMR measurement described in the EXAMPLES section of the present specification.

The polymer (α1) can be produced by performing ring-opening polymerization using a monomer composition containing a dicyclopentadiene such as dicyclopentadiene, methyldicyclopentadiene, or 5,6-dihydrodicyclopentadiene (hereinafter, also referred to as "monomer composition (α1)") to obtain a ring-opened polymer and then hydrogenating at least some of the unsaturated bonds present in the ring-opened polymer. When all monomers contained in the monomer composition (α1) are taken to be 100 mass %, the percentage content of the dicyclopentadiene is preferably more than 90 mass %, and more preferably more than 95 mass %. No specific limitations are placed on monomers other than the dicyclopentadiene that may be contained in the monomer composition (α1) so long as they are copolymerizable with the dicyclopentadiene. For example, a norbornene, cycloolefin, or diene other than the dicyclopentadiene may be contained in the monomer composition (α1).

Moreover, endo and exo stereoisomers exist for dicyclopentadienes. The dicyclopentadiene contained in the monomer composition (α1) may be an endo isomer or an exo isomer. Note that the dicyclopentadiene may include just the endo isomer or may include just the exo isomer. Alternatively, a stereoisomer mixture of the endo isomer and the exo isomer in any ratio may be contained in the monomer composition (α1) as the dicyclopentadiene. In particular, it is preferable that either the endo isomer or the exo isomer is a main component of the dicyclopentadiene because this makes it easier to obtain a resin shaped product having various excellent properties, and, more specifically, to obtain a cosmetic container having excellent water resistance, chemical resistance, and ease of wiping off oil content and a semiconductor container having high heat resistance and chemical resistance. In other words, when the content of all dicyclopentadiene contained in the monomer composition (α1) is taken to be 100 mass %, the proportion of either the endo isomer or the exo isomer is preferably more than 50 mass %. Moreover, the proportion constituted by a stereoisomer that is a main component of the dicyclopentadiene contained in the monomer composition (α1) is preferably 80 mass % or more, more preferably 90 mass % or more, and even more preferably 95 mass % or more. Note that since the endo isomer of a dicyclopentadiene is easier to synthesize than the exo isomer, the proportion constituted by the endo isomer among the dicyclopentadiene contained in the monomer composition (α1) is preferably higher than the proportion constituted by the exo isomer.

No specific limitations are placed on the ring-opening polymerization catalyst used in synthesis of the polymer (α1) other than being a catalyst with which ring-opening polymerization of a dicyclopentadiene can be performed to obtain a ring-opened polymer having syndiotactic stereoregularity. Examples of preferable ring-opening polymerization catalysts include catalysts that include a metal compound indicated by the following formula (1).

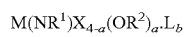  (1)

In formula (1), M is a metal atom selected from transition metals in group 6 of the periodic table, R$^1$ is a phenyl group that optionally has a substituent at one or more of the 3, 4, and 5 positions or a group represented by —CH$_2$R$^3$ (R$^3$ is a hydrogen atom, an optionally substituted alkyl group, or an optionally substituted aryl group), R$^2$ is a group selected from an optionally substituted alkyl group and an optionally substituted aryl group, X is a group selected from a halogen atom, an optionally substituted alkyl group, an optionally substituted aryl group, and an alkyl silyl group, and L is an electron donating neutral ligand. Moreover, a is 0 or 1, and b is an integer of 0 to 2.

M is a transition metal atom in group 6 of the periodic table (chromium, molybdenum, or tungsten), is preferably molybdenum or tungsten, and is more preferably tungsten.

Although no specific limitations are placed on the carbon number of the phenyl group of R$^1$ that optionally has a substituent at one or more of the 3, 4, and 5 positions, the carbon number is normally 6 to 20, and preferably 6 to 15.

Examples of possible substituents include alkyl groups such as a methyl group and an ethyl group; halogen atoms such as a fluorine atom, a chlorine atom, and a bromine atom; and alkoxy groups such as a methoxy group, an ethoxy group, and a propoxy group.

Moreover, substituents present at two or more of the 3, 4, and 5 positions may be bonded to each other to form a ring structure.

The phenyl group optionally having a substituent at one or more of the 3, 4, and 5 positions may, for example, be an unsubstituted phenyl group; a monosubstituted phenyl group such as a 4-methylphenyl group, a 4-chlorophenyl group, a 3-methoxyphenyl group, a 4-cyclohexylphenyl group, or a 4-methoxyphenyl group; a disubstituted phenyl group such as a 3,5-dimethylphenyl group, a 3,5-dichlorophenyl group, a 3,4-dimethylphenyl group, or a 3,5-dimethoxyphenyl group; a trisubstituted phenyl group such as a 3,4,5-trimethylphenyl group or a 3,4,5-trichlorophenyl group; or an optionally substituted 2-naphthyl group such as a 2-naphthyl group, a 3-methyl-2-naphthyl group, or a 4-methyl-2-naphthyl group.

In the group of R$^1$ that is represented by —CH$_2$R$^3$, R$^3$ is a group selected from a hydrogen atom, an optionally substituted alkyl group, and an optionally substituted aryl group.

Although no specific limitations are placed on the carbon number of the optionally substituted alkyl group of R$^3$, the carbon number is normally 1 to 20, and preferably 1 to 10. The alkyl group may be a linear alkyl group or a branched alkyl group.

Examples of possible substituents include optionally substituted phenyl groups such as a phenyl group and a 4-methylphenyl group; and alkoxy groups such as a methoxy group and an ethoxy group.

The optionally substituted alkyl group of R$^3$ may, for example, be a methyl group, an ethyl group, a propyl group, an isopropyl group, an n-butyl group, an isobutyl group, a t-butyl group, a pentyl group, a neopentyl group, a benzyl group, a neophyl group, or the like.

Although no specific limitations are placed on the carbon number of the optionally substituted aryl group of R$^3$, the carbon number is normally 6 to 20, and preferably 6 to 15.

Examples of possible substituents include alkyl groups such as a methyl group and an ethyl group; halogen atoms such as a fluorine atom, a chlorine atom, and a bromine atom; and alkoxy groups such as a methoxy group, an ethoxy group, and an isopropoxy group.

The optionally substituted aryl group of R$^3$ may, for example, be a phenyl group, a 1-naphthyl group, a 2-naphthyl group, a 4-methylphenyl group, a 2,6-dimethylphenyl group, or the like.

Of these examples, the group represented by R$^3$ is preferably an alkyl group having a carbon number of 1 to 20.

Examples of the halogen atom of X include a chlorine atom, a bromine atom, and an iodine atom.

Examples of the optionally substituted alkyl group and the optionally substituted aryl group of X include the same examples as given for the optionally substituted alkyl group and the optionally substituted aryl group of R$^3$.

Examples of the alkyl silyl group of X include a trimethylsilyl group, a triethylsilyl group, and a t-butyldimethylsilyl group.

In a case in which the metal compound indicated by formula (1) includes two or more X groups, these groups may be bonded to each other to form a ring structure.

Examples of the optionally substituted alkyl group and the optionally substituted aryl group of R$^2$ include the same examples as given for the optionally substituted alkyl group and the optionally substituted aryl group of R$^3$.

The electron donating neutral ligand of L may, for example, be an electron donating ligand that includes an atom from group 15 or 16 of the periodic table. Specific examples include phosphines such as trimethylphosphine, triisopropylphosphine, tricyclohexylphosphine, and triphenylphosphine; ethers such as diethyl ether, dibutyl ether, 1,2-dimethoxyethane, and tetrahydrofuran; and amines such as trimethylamine, triethylamine, pyridine, and lutidine. Of these examples, ethers are preferable.

The metal compound indicated by formula (1) is preferably a tungsten compound that includes a phenylimide group (compound for which M is a tungsten atom and R$^1$ is a phenyl group in formula (1)), and is more preferably a tetrachlorotungsten phenylimide (tetrahydrofuran) complex.

No specific limitations are placed on the method by which the metal compound indicated by formula (1) is synthesized and a method described in JP H5-345817 A, for example, may be used. Specifically, the target metal compound can be synthesized by mixing an oxyhalide of a group 6 transition metal, a phenyl isocyanate optionally having a substituent at one or more of the 3, 4, and 5 positions or a monosubstituted methyl isocyanate, an electron donating neutral ligand (L), and, as necessary, an alcohol, metal alkoxide, or metal aryloxide.

After synthesis of the metal compound, the reaction liquid may be used as obtained as a catalyst solution for a ring-opening polymerization reaction or the metal compound may be isolated and purified by commonly known purification treatment such as crystallization and then the obtained metal compound may be used in a ring-opening polymerization reaction.

The ring-opening polymerization catalyst may be composed of just the metal compound indicated by formula (1) or may be a combination of the metal compound indicated by formula (1) and an organometallic reducing agent. The use of a combination of the metal compound indicated by formula (1) and an organometallic reducing agent improves polymerization activity.

The organometallic reducing agent may, for example, be an organometallic compound of any of groups 1, 2, 12, 13, and 14 of the periodic table that includes a hydrocarbon group having a carbon number of 1 to 20.

Examples of the organometallic compound include an organolithium such as methyllithium, n-butyllithium, or phenyllithium; an organomagnesium such as butylethylmagnesium, butyloctylmagnesium, dihexylmagnesium, ethylmagnesium chloride, n-butylmagnesium chloride, or allylmagnesium bromide; an organozinc such as dimethylzinc, diethylzinc, or diphenylzinc; an organoaluminum such as trimethylaluminum, triethylaluminum, triisobutylaluminum, di ethyl aluminum chloride, ethyl aluminum sesquichloride, ethylaluminum dichloride, diethylaluminumethoxide, diisobutylaluminum isobutoxide, ethylaluminum diethoxide, or isobutylaluminum diisobutoxide; and an organotin such as tetramethyltin, tetra(n-butyl)tin, or tetraphenyltin.

Of these examples, an organoaluminum or an organotin is preferable.

The ring-opening polymerization reaction is normally carried out in an organic solvent. No specific limitations are placed on the organic solvent that is used other than being a solvent in which a ring-opened polymer or hydrogenated product thereof can be dissolved or dispersed under certain conditions and that does not interfere with the ring-opening polymerization reaction or a hydrogenation reaction.

Examples of organic solvents that may be used include aliphatic hydrocarbons such as pentane, hexane, and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, and xylene; halogenated aliphatic hydrocarbons such as dichloromethane, chloroform, and 1,2-dichloroethane; halogenated aromatic hydrocarbons such as chlorobenzene and dichlorobenzene; nitrogen-containing hydrocarbons such as nitromethane, nitrobenzene, and acetonitrile; ethers such as diethyl ether and tetrahydrofuran; and mixed solvents that are a combination of any of the preceding examples.

Of these organic solvents, aromatic hydrocarbons, aliphatic hydrocarbons, alicyclic hydrocarbons, and ethers are preferable.

The ring-opening polymerization reaction can be initiated by mixing the monomer(s), the metal compound indicated by formula (1), and, as necessary, the organometallic reducing agent. No specific limitations are placed on the order in which these components are added. For example, a solution containing the metal compound indicated by formula (1) and the organometallic reducing agent may be added to and mixed with a solution containing the monomer(s), a solution containing the monomer(s) and the metal compound indicated by formula (1) may be added to and mixed with a solution containing the organometallic reducing agent, or a solution containing the metal compound indicated by formula (1) may be added to and mixed with a solution containing the monomer(s) and the organometallic reducing agent.

Addition of each of the components may be performed by adding all of the component at once or by dividing the component between a plurality of additions. Moreover, addition may be performed continuously over a relatively long time period (for example, 1 minute or longer).

The monomer concentration at the start of the ring-opening polymerization reaction is not specifically limited but is normally 1 mass % to 50 mass %, preferably 2 mass % to 45 mass %, and more preferably 3 mass % to 40 mass %. Productivity may decrease if the monomer concentration is too low, whereas solution viscosity after the ring-opening polymerization reaction may be too high and the subsequent hydrogenation reaction may become difficult if the monomer concentration is too high.

The amount of the metal compound indicated by formula (1) that is used in the ring-opening polymerization reaction is normally an amount such that a molar ratio of "metal compound:monomer" is 1:100 to 1:2,000,000, preferably 1:500 to 1:1,000,000, and more preferably 1:1,000 to 1:500,000. Removal of the metal compound after the reaction may become difficult if the amount of the metal compound is too large, whereas sufficient polymerization activity may not be obtained if the amount of the metal compound is too small.

In a case in which the organometallic reducing agent is used, the amount thereof per 1 mol of the metal compound indicated by formula (1) is preferably 0.1 mol to 100 mol, more preferably 0.2 mol to 50 mol, and particularly preferably 0.5 mol to 20 mol. Polymerization activity may not be sufficiently improved if the amount of the organometallic reducing agent that is used is too small, whereas side reactions may occur more easily if the amount of the organometallic reducing agent that is used is too large.

An activity modifier may be added to the polymerization reaction system. The use of an activity modifier can stabilize the ring-opening polymerization catalyst and adjust the reaction rate of the ring-opening polymerization reaction and the molecular weight distribution of the polymer.

The activity modifier may be any organic compound having a functional group without any specific limitations. For example, the activity modifier may be an oxygen-containing compound, a nitrogen-containing compound, or a phosphorus-containing compound.

Examples of oxygen-containing compounds that may be used include ethers such as diethyl ether, diisopropyl ether, dibutyl ether, anisole, furan, and tetrahydrofuran; ketones such as acetone, benzophenone, and cyclohexanone; and esters such as ethyl acetate.

Examples of nitrogen-containing compounds that may be used include nitriles such as acetonitrile and benzonitrile; amines such as triethylamine, triisopropylamine, quinuclidine, and N,N-diethylaniline; and pyridines such as pyridine, 2,4-lutidine, 2,6-lutidine, and 2-t-butylpyridine.

Examples of phosphorus-containing compounds that may be used include phosphines such as triphenylphosphine, tricyclohexylphosphine, triphenyl phosphate, and trimethyl phosphate; and phosphine oxides such as triphenylphosphine oxide.

One activity modifier may be used individually, or two or more activity modifiers may be used in combination. The amount of the activity modifier that is added is not specifically limited and may normally be selected from a range of 0.01 mol % to 100 mol % relative to the metal compound indicated by formula (1).

A molecular weight modifier may be added to the polymerization reaction system in order to adjust the molecular weight of the ring-opened polymer. Examples of molecular weight modifiers that may be used include α-olefins such as 1-butene, 1-pentene, 1-hexene, and 1-octene; aromatic vinyl compounds such as styrene and vinyltoluene; oxygen-containing vinyl compounds such as ethyl vinyl ether, isobutyl vinyl ether, allyl glycidyl ether, allyl acetate, allyl alcohol, and glycidyl methacrylate; halogen-containing vinyl compounds such as allyl chloride; nitrogen-containing vinyl compounds such as acrylamide; non-conjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; and conjugated dienes such as 1,3-butadiene, 2-methyl-1,3-butadiene, 2,3-dimethyl-1,3-butadiene, 1,3-pentadiene, and 1,3-hexadiene.

One molecular weight modifier may be used individually, or two or more molecular weight modifiers may be used in combination.

The amount of the molecular weight modifier that is added may be set as appropriate depending on the target molecular weight and may normally be selected from a range of 0.1 mol % to 50 mol % relative to dicyclopentadiene.

The polymerization temperature is not specifically limited but is normally within a range of −78° C. to +200° C., and preferably within a range of −30° C. to +180° C. The polymerization time is not specifically limited and depends on the scale of reaction, but is normally within a range of 1 minute to 1,000 hours.

Although no specific limitations are placed on the weight-average molecular weight (Mw) of the ring-opened polymer of the dicyclopentadiene, the weight-average molecular weight (Mw) is normally 1,000 to 1,000,000, and preferably 2,000 to 500,000. By subjecting the ring-opened polymer having such a weight-average molecular weight to a hydrogenation reaction, it is possible to obtain a polymer (α1) having an excellent balance of shaping processability, chemical resistance, and so forth. The weight-average molecular weight of the ring-opened polymer can be adjusted by adjusting the additive amount of the molecular weight modifier used in polymerization, for example.

Although no specific limitations are placed on the molecular weight distribution (Mw/Mn) of the ring-opened polymer of the dicyclopentadiene, the molecular weight distribution (Mw/Mn) is normally 1.0 to 4.0, and preferably 1.5 to 3.5. By subjecting the ring-opened polymer having such a molecular weight distribution to a hydrogenation reaction, it is possible to obtain a polymer (α1) having excellent shaping processability. The molecular weight distribution of the ring-opened polymer can be adjusted through the addition method and the concentration of the monomer(s) in the polymerization reaction.

The weight-average molecular weight (Mw) and the molecular weight distribution (Mw/Mn) of the ring-opened polymer of the dicyclopentadiene are taken to be polystyrene-equivalent values that are measured by gel permeation chromatography (GPC) using tetrahydrofuran as a developing solvent.

Through this ring-opening polymerization reaction, it is possible to obtain a ring-opened polymer of the dicyclopentadiene having syndiotactic stereoregularity. When reaction conditions in a hydrogenation reaction carried out after the ring-opening polymerization reaction are appropriately set, the tacticity of the ring-opened polymer does not normally change through this hydrogenation reaction. Therefore, the target polymer (α1) can be obtained by subjecting the ring-opened polymer of the dicyclopentadiene having syndiotactic stereoregularity to the hydrogenation reaction. The degree of syndiotactic stereoregularity of the ring-opened polymer can be adjusted by selecting the type of ring-opening polymerization catalyst or altering the amount of the ring-opening polymerization catalyst that is used. For example, using a smaller amount of the ring-opening polymerization catalyst tends to increase syndiotactic stereoregularity.

The hydrogenation reaction of the ring-opened polymer can be carried out by supplying hydrogen into the reaction system in the presence of a hydrogenation catalyst. The hydrogenation catalyst may be a commonly known homogeneous catalyst or heterogeneous catalyst that is used as a hydrogenation catalyst for olefin compounds.

Examples of homogeneous catalysts that may be used include catalysts composed of a combination of a transition metal compound and an organoaluminum compound such as cobalt acetate/triethylaluminum and nickel acetylacetonate/triisobutylaluminum; catalysts composed of a combination of a transition metal compound and an organoalkali metal compound such as titanocene dichloride/n-butyllithium and zirconocene dichloride/sec-butyllithium; catalysts composed of a combination of a transition metal compound and an organomagnesium compound such as tetrabutoxytitanate/dimethylmagnesium; and precious metal complex catalysts such as bis(triphenylphosphine)palladium dichloride, chlorohydridocarbonyltris(triphenylphosphine)ruthenium, chlorohydridocarbonylbis(tricyclohexylphosphine)ruthenium, bis(tricyclohexylphosphine)benzylidene ruthenium(IV) dichloride, and tris(triphenylphosphine)rhodium chloride.

Examples of heterogeneous catalysts that may be used include metal catalysts such as nickel, palladium, platinum, rhodium, and ruthenium; and solid catalysts having any of these metals supported on a support (for example, carbon, silica, diatomaceous earth, alumina, or titanium oxide) such as nickel/silica, nickel/diatomaceous earth, nickel/alumina, palladium/carbon, palladium/silica, palladium/diatomaceous earth, and palladium/alumina.

The hydrogenation reaction is normally carried out in an inert organic solvent. Examples of inert organic solvents that may be used include aromatic hydrocarbons such as benzene and toluene; aliphatic hydrocarbons such as pentane and hexane; alicyclic hydrocarbons such as cyclohexane and decahydronaphthalene; and ethers such as tetrahydrofuran and ethylene glycol dimethyl ether.

The inert organic solvent may be the same solvent as used in the ring-opening polymerization reaction or may be a different solvent. Moreover, the hydrogenation reaction may be carried out by adding the hydrogenation catalyst to the ring-opening polymerization reaction liquid as obtained.

Although the reaction conditions of the hydrogenation reaction differ depending on the hydrogenation catalyst that is used, the reaction temperature is normally −20° C. to +250° C., preferably −10° C. to +220° C., and more preferably 0° C. to +200° C. The reaction rate may become too slow if the reaction temperature is too low, whereas side reactions may occur if the reaction temperature is too high.

The hydrogen pressure is normally 0.01 MPa to 20 MPa, preferably 0.05 MPa to 15 MPa, and more preferably 0.1 MPa to 10 MPa. The reaction rate may be too slow if the hydrogen pressure is too low, whereas special equipment such as a reactor having high pressure resistance may be required if the hydrogen pressure is too high.

The reaction time is not specifically limited so long as the desired percentage hydrogenation is reached, but is normally 0.1 hours to 10 hours. The target polymer (α1) may be collected by a standard method after the hydrogenation reaction. Moreover, the collected polymer (α1) may be dried by a standard method.

Although no specific limitations are placed on the percentage hydrogenation (proportion of unsaturated bonds that are hydrogenated) in the hydrogenation reaction, the percentage hydrogenation is preferably 98% or more, and more preferably 99% or more. Heat resistance of the polymer (α1) tends to improve with increasing percentage hydrogenation. The percentage hydrogenation can be measured by $^1$H-NMR.

In the present disclosure, the polymer (α) may be one type of polymer used individually or two or more types of polymers used in combination.

—Compound (β)—

The presently disclosed shaping material may further contain a compound (β) that is a compound that differs from the polymer (α) in terms of chemical composition and properties and that also differs from other components such as additives described further below.

The compound ((3) may, for example, be an impurity such as residual monomer from synthesis of the polymer (α) or a reaction solvent used in the polymerization reaction or hydrogenation reaction in synthesis of the polymer (α). In a case in which such impurities have a melting point, the melting point may be lower than the melting point of the polymer (α). It is preferable that the content of the compound (β) in the shaping material is extremely small. Crystallization of the shaping material becomes easier when the content of the compound (β) in the shaping material is small. Moreover, mechanical strength of an obtained resin shaped product or the like can be increased and the amount of outgas can be reduced when the amount of the compound (β) in the shaping material is small.

—Other Components—

The presently disclosed shaping material may optionally contain other components such as additives depending on the application. Examples of additives that may be used include antioxidants, crystal nucleating agents, waxes, ultraviolet absorbers, light stabilizers, near-infrared absorbers, colorants such as dyes and pigments, plasticizers, antistatic agents, fluorescent whitening agents, and conductive materials. For example, in a case in which the shaping material is to be used in production of a cosmetic container, it is preferable that an antioxidant, a crystal nucleating agent, a wax, and the like are compounded as additives. Moreover, in a case in which the shaping material is to be used in production of a semiconductor container, for example, it is preferable that an antioxidant, a crystal nucleating agent, a conductive material, and the like are compounded as additives. The following provides specific examples of some of these additives.

Examples of antioxidants that may be used include phenolic antioxidants, phosphoric antioxidants, and sulfuric antioxidants.

Examples of phenolic antioxidants include 3,5-di-t-butyl-4-hydroxytoluene, 2,2'-methylenebis(6-t-butyl-4-methylphenol), 4,4'-butylidenebis(6-t-butyl-3-methylphenol), 4,4'-thiobis(6-t-butyl-3-methylphenol), α-tocopherol, 2,2,4-trimethyl-6-hydroxy-7-t-butylchromane, tetrakis[methylene-3-(3',5'-di-t-butyl-4'-hydroxyphenyl)propionate]methane, and pentaerythritol tetrakis[3-(3,5-di-t-butyl-4-hydroxyphenyl)propionate].

Examples of phosphoric antioxidants include distearyl pentaerythritol diphosphite, bis(2,4-di-t-butylphenyl)pentaerythritol diphosphite, tris(2,4-di-t-butylphenyl) phosphite, tetrakis(2,4-di-t-butylphenyl)-4,4'-biphenyl diphosphite, and trinonylphenyl phosphite.

Examples of sulfuric antioxidants include distearyl thiodipropionate and dilauryl thiodipropionate.

In a case in which the shaping material contains an antioxidant, the content of the antioxidant is normally 0.01 mass % to 10 mass %, and preferably 0.02 mass % to 5 mass % based on the entire shaping material.

One antioxidant may be used individually, or two or more antioxidants may be used in combination.

Examples of crystal nucleating agents that may be used include sorbitol-based compounds, metal salts of organic phosphoric acids, metal salts of organic carboxylic acids, kaolin, and talc.

Examples of sorbitol-based compounds include dibenzylidene sorbitol and diparamethyldibenzylidene sorbitol.

Examples of metal salts of organic phosphoric acids include sodium 2,2'-methylenebis(4,6-di-tert-butylphenyl) phosphate and bis(2,4,8,10-tetra-tert-butyl-6-hydroxy-12H-dibenzo[d,g][1,2,3]dioxaphosphocin-6-oxide) aluminum hydroxide.

Examples of metal salts of organic carboxylic acids include sodium benzoate, potassium benzoate, calcium oxalate, and magnesium stearate.

In a case in which the shaping material contains a crystal nucleating agent, the content of the crystal nucleating agent is normally 0.005 mass % to 10 mass %, and preferably 0.05 mass % to 5 mass % based on the entire shaping material.

Examples of waxes that may be used include petroleum-based wax (paraffin wax, microcrystalline wax, or petrolatum), Fischer-Tropsch wax, and polyalkylene wax.

In a case in which the shaping material contains a wax, the content of the wax is normally 0.05 mass % to 20 mass %, and preferably 0.5 mass % to 10 mass % based on the entire shaping material.

Examples of conductive materials that may be used include, but are not specifically limited to, conductive carbon materials such as carbon black and carbon fiber, and metal materials such as copper and aluminum. The amount of the conductive material is normally 1 mass % to 20 mass % based on the entire shaping material.

In a case in which the shaping material contains an additive other than those listed above, the content of the additive can be set as appropriate depending on the application.

In a case in which the shaping material contains additives, the shaping material may be produced by a commonly known method without any specific limitations.

For example, the shaping material containing the additives can be produced by a method in which the additives are mixed with the polymer (α1) after purification thereof, which is described further below, or a method in which the additives are mixed with the polymer (α) straight after production of the polymer (α) and then the resultant shaping material is subjected to purification.

The method by which the polymer (α) and the additives are mixed in these production methods is preferably kneading in a molten state.

The kneading can be performed using a melt-kneading machine such as a single screw extruder, a twin screw extruder, a Banbury mixer, a kneader, or a Feeder Ruder. The kneading temperature is preferably within a range of 200° C. to 400° C., and more preferably within a range of 240° C. to 350° C. In the kneading, each of the components may be added all at once and then kneaded or may be added as a number of portions while being kneaded.

After the kneading, pelletization can be performed by a standard method by extruding the kneaded product in a rod-like form and cutting the kneaded product to an appropriate length using a strand cutter.

[Amount of Chlorobenzene-Soluble Components]

When the shaping material is immersed in chlorobenzene to obtain an extract containing eluted components from the shaping material and then the amount of these eluted components is measured by a specific method, the percentage content of the eluted components in the shaping material is required to be 1,000 ppm or less. The "specific method" referred to above is gas chromatography analysis using o-dichlorobenzene as a standard substance.

The content of eluted components can be calculated as an o-dichlorobenzene-equivalent value from a ratio of the area of other peaks relative to the area of a peak for o-dichlorobenzene in a gas chromatogram obtained by gas chromatography analysis. Note that the main component among chlorobenzene-soluble components that can be contained in the shaping material may be the previously described compound (β), for example.

The amount of chlorobenzene-soluble components as a proportion relative to the entire shaping material, which can be measured as described above, is required to be 1,000 ppm or less, is preferably 500 ppm or less, and is more preferably 100 ppm or less. Although the amount of chlorobenzene-soluble components is preferably as small as possible and has no specific lower limit, the amount is normally 0.1 ppm or more.

A shaping material in which the proportion of chlorobenzene-soluble components is not more than any of the upper limits set forth above has excellent formability and can efficiently increase the degree of crystallinity of an obtained shaped item. This can also increase mechanical strength, heat resistance, and so forth of the obtained shaped item.

[Method of Reducing Amount of Chlorobenzene-Soluble Components]

No specific limitations are placed on how the proportion of chlorobenzene-soluble components is reduced.

For example, a shaping material for which the proportion of eluted components is not more than any of the upper limits set forth above can be efficiently obtained by performing purification of the polymer (α) after it has been collected from the reaction solution and undergone an optional drying step or of a shaping material containing the polymer (α) and the previously described optional additives (hereinafter, also referred to collectively as the "crude polymer (α) or the like").

The purification may, for example, be heat treatment in which the crude polymer (α) or the like is heated in a stream of gas, in a liquid, or while in contact with a solid; extraction treatment in which the crude polymer (α) or the like and an extractant are brought into contact; reprecipitation treatment in which the crude polymer (α) or the like is dissolved in a suitable solvent and is then caused to reprecipitate; melting treatment in which any of the preceding purification methods is implemented after melting the crude polymer (α) or the like; or the like.

These purification methods are commonly known methods. For example, JP 2011-26614 A discloses a coagulation method and a direct drying method as methods by which a volatile component such as a solvent can be removed.

However, it is difficult to obtain a shaping material for which the proportion of eluted components is not more than any of the upper limits set forth above using the purification conditions described in JP 2011-26614 A in the stated form, for example, because it is not easy to reduce the content of the compound (β) contained in the crude polymer (α) or the like.

For this reason, it is important that purification is carried out under conditions of higher temperature, longer purification time, lower pressure, or the like compared to conventional purification conditions.

Among the purification methods described above, purification by a method in which the crude polymer (α) or the like is heated for a long time is preferable because the proportion of eluted components can be more efficiently reduced.

The heating temperature in this purification (purification temperature) is normally not lower than 140° C. and not higher than 300° C., and preferably not lower than 150° C. and not higher than 250° C., whereas the heating time in this purification (purification time) is normally not less than 0.5 hours and not more than 100 hours, and preferably not less than 1 hour and not more than 48 hours. The pressure in the purification may be a pressure corresponding to a standard state in accordance with JIS Z 8703. Moreover, the atmosphere in the purification may be an air atmosphere (for example, a standard atmosphere in accordance with JIS W 0201) or may be an inert gas atmosphere containing nitrogen gas and a noble gas such as argon gas.

[Shaping Method of Shaping Material]

The alicyclic structure-containing resin contained in the presently disclosed shaping material has excellent crystallinity and has a characteristic of crystallizing in a short time upon cooling from a molten state. Therefore, the presently disclosed shaping material containing this alicyclic structure-containing resin can suitably be used in melt shaping methods. Examples of melt shaping methods include extrusion molding, injection molding, melt spinning, press forming, blow molding, injection blow molding, and calendering. Of these methods, injection molding is preferable because it can sufficiently exploit the characteristics of the presently disclosed shaping material.

The use of the presently disclosed shaping material in injection molding enables stable production of a resin shaped product in which crystallization has sufficiently progressed.

2) Resin Shaped Product

The presently disclosed resin shaped product is a product that is obtained through melt shaping of the presently disclosed shaping material set forth above. The presently disclosed resin shaped product has excellent mechanical strength since it is a melt shaped item of the presently disclosed shaping material. This is because the crystalline alicyclic structure-containing resin contained in the presently disclosed shaping material has excellent crystallinity, and thus a resin shaped product containing a resin in which crystallization has sufficiently progressed can be provided through melt shaping of the presently disclosed shaping material.

Examples of melt shaping methods that can be used in production of the presently disclosed resin shaped product include the same shaping methods as given as examples of shaping methods in the "Shaping method of shaping material" section of "1) Shaping material". Of these shaping methods, injection molding is preferable.

3) Cosmetic Container

The presently disclosed cosmetic container is a shaped item of the presently disclosed shaping material set forth above. More specifically, the presently disclosed cosmetic container is a shaped item of a shaping material that contains a crystalline alicyclic structure-containing resin having a melting point of 200° C. or higher and in which the content of chlorobenzene-soluble components is 1,000 ppm or less as an o-dichlorobenzene-equivalent value based on gas chromatography analysis with o-dichlorobenzene as a standard substance. Consequently, the presently disclosed cosmetic container has excellent water resistance, chemical resistance, and ease of wiping off oil content.

In particular, the cosmetic container has excellent water resistance, chemical resistance, and ease of wiping off oil content when the melting point of the crystalline alicyclic structure-containing resin contained in the shaping material is 200° C. or higher or satisfies any of the ranges set forth above as preferable ranges for the "melting point of polymer (α)".

Moreover, when the content of chlorobenzene-soluble components in the shaping material as an o-dichlorobenzene-equivalent value based on gas chromatography analysis with o-dichlorobenzene as a standard substance is 1,000 ppm or less or satisfies any of the preferable upper limits set forth above in the "Amount of chlorobenzene-soluble components" section of "1) Shaping material", the degree of crystallinity of the alicyclic structure-containing resin contained in the cosmetic container can be sufficiently increased, and mechanical strength of the cosmetic container can be increased.

[Production Method of Cosmetic Container]

Examples of melt shaping methods that can be used in production of the presently disclosed cosmetic container include the same shaping methods as given as examples of shaping methods in the "Shaping method of shaping material" section of "1) Shaping material". The shaping method can be selected as appropriate depending on the shape of the target cosmetic container and so forth.

[Shape of Cosmetic Container]

The presently disclosed cosmetic container may, for example, be a pencil-type container, a jar-type container, or a tube-type container.

The pencil-type container is, for example, a container in a form like that of a writing instrument that includes, for example, an outer tube that serves as a main body of the container, an inner tube housed inside the outer tube, an applicator disposed at a tip of the outer tube, and a cap that protects the applicator. A cosmetic is normally housed directly inside the outer tube or inside the inner tube. The pencil-type container can normally be used to suitably house a cosmetic such as an eyeliner, eyebrow cosmetic, or eyeshadow.

The pencil-type container can be produced by injection molding, for example.

The jar-type container is, for example, a container that includes a main body that is a pseudo-circular tube and a lid. A cosmetic is housed inside the main body of the container. The jar-type container can normally be used to suitably house a cream or gel cosmetic.

The jar-type container can be produced by injection molding, for example.

The tube-type container is, for example, a container that includes a main body that is tube shaped and a lid. A cosmetic is housed inside the main body of the container. The tube-type container can normally be used to suitably house a cream or gel cosmetic.

The main body of a tube-type container can normally be produced by blow molding.

4) Semiconductor Container

The presently disclosed semiconductor container is a shaped item of the presently disclosed shaping material set forth above. More specifically, the presently disclosed semiconductor container is a shaped item of a shaping material that contains a crystalline alicyclic structure-containing resin having a melting point of 200° C. or higher and in which the content of chlorobenzene-soluble components is 1,000 ppm or less as an o-dichlorobenzene-equivalent value based on gas chromatography analysis with o-dichlorobenzene as a standard substance. Consequently, the presently disclosed semiconductor container has excellent heat resistance.

In particular, when the content of chlorobenzene-soluble components in the shaping material as an o-dichlorobenzene-equivalent value based on gas chromatography analysis with o-dichlorobenzene as a standard substance is 1,000 ppm or less or satisfies any of the preferable upper limits set forth above in the "Amount of chlorobenzene-soluble components" section of "1) Shaping material", the degree of crystallinity of the alicyclic structure-containing resin forming the semiconductor container can be sufficiently increased, and mechanical strength of the semiconductor container can be increased. The chlorobenzene-soluble components include content of the compound (β), which is inclusive of organic solvent used in synthesis of the alicyclic structure-containing resin as previously described. Accordingly, when a shaping material is said to contain chlorobenzene-soluble components, this means that the shaping material contains volatile components. Accordingly, outgassing may occur if chlorobenzene-soluble components remain in the semiconductor container (shaped item). This outgas becomes a cause of contamination of contents (for example, a wafer) housed in the semiconductor container. However, when the proportion of chlorobenzene-soluble components in the shaping material is not more than any of the upper limits set forth above, the amount of outgas evolved from the semiconductor container decreases and contamination of a wafer or the like can be inhibited. The yield in semiconductor production can be improved as a result. Note that the amount of outgas evolved from the semiconductor container can be measured by a method described in the EXAMPLES section.

[Degree of Crystallinity of Semiconductor Container]

The semiconductor container preferably has a degree of crystallinity of 10% or more. A degree of crystallinity of 10% or more provides high chemical resistance (particularly resistance to an oil/fat cleaning agent). The degree of crystallinity of the semiconductor container is more preferably 15% or more, and even more preferably 20% or more, and may normally be 50% or less from a viewpoint of production efficiency. The degree of crystallinity of the semiconductor container can be controlled by adjusting the lower limit temperature of the crystallization temperature range and the holding time in the shaping step of the subsequently described method of producing a semiconductor container.

5) Method of Producing Semiconductor Container

The presently disclosed semiconductor container set forth above can be favorably produced by the presently disclosed method of producing a semiconductor container. The presently disclosed method of producing a semiconductor container includes a purification step of holding a target resin including a crystalline alicyclic structure-containing resin having a melting point Tm (° C.) of 200° C. or higher in a purification temperature range of not lower than 140° C. and not higher than 300° C. for not less than 0.5 hours and not more than 100 hours to obtain a purified target resin (i.e., the "shaping material" set forth above); and a shaping step of heating a pre-crystallization shaping material including the purified target resin to a higher temperature than the melting point Tm (° C.) to melt the pre-crystallization shaping material and subsequently shaping the pre-crystallization shaping material while holding the pre-crystallization shaping material in a crystallization temperature range of not lower than (Tm−140°) C. and lower than the melting point Tm (° C.) to cause crystallization.

<Purification Step>

The purification step corresponds to the "method in which the crude polymer (α) or the like is heated for a long time" described in detail in the "Method of reducing amount of chlorobenzene-soluble components" section. As previously defined, the "crude polymer (α)" is a composition that may contain the polymer (α), which is a crystalline alicyclic structure-containing resin, and optional additives. Note that in a case in which the purification step is implemented using a crude polymer (α) with which additives have not been compounded as the "target resin", an additive compounding step of compounding additives with the purified target resin may be implemented at a timing after the purification step and before the subsequently described shaping step.

(Shaping Step)

In the shaping step, the pre-crystallization shaping material obtained through the purification step and the optional additive compounding step is melted and is then shaped into a shaped item of a desired shape while being held in a crystallization temperature range of not lower than (Tm−140°) C. and lower than the melting point Tm (° C.) to cause crystallization. The crystallization temperature range may preferably be a temperature range of (Tm−125°) C. or higher, and more preferably (Tm−110°) C. or higher. The upper limit temperature of the crystallization temperature range is lower than the melting point Tm (° C.). The pre-crystallization shaping material that has been melted by heating to a higher temperature than the melting point Tm (° C.) starts to crystallize once the temperature drops below the melting point Tm (° C.) and falls to a crystallization onset temperature after heating has stopped. The inventors discovered that when the shaping material crystallizes at a temperature that is not lower than any of the preferable lower limits for the crystallization temperature range set forth above, the degree of crystallinity of an obtained shaped item can be favorably increased. Although the reason for this is not clear, it is presumed to be due to the following characteristics of the shaping material that were discovered by the inventors.

Firstly, studies carried out by the inventors revealed that the shaping material set forth above readily crystallizes and crystallization from a molten state tends to be completed in a short time. As a result of further studies, the inventors discovered that by causing the shaping material set forth above to crystallize slowly in a comparatively high temperature range such as set forth above, the degree of crystallinity of an obtained shaped item can be significantly increased. For this reason, a crystallization step performed under the conditions set forth above is thought to enable efficient production of a semiconductor container having a high degree of crystallinity.

The holding time under the temperature conditions set forth above is preferably not less than 10 seconds and not more than 200 seconds. The degree of crystallinity of the obtained shaped item can be favorably increased by setting the holding time as not less than the lower limit set forth above.

Moreover, production efficiency of the semiconductor container can be increased by setting the holding time as not more than the upper limit set forth above.

The content of chlorobenzene-soluble components in the pre-crystallization shaping material used in the shaping step is preferably 1,000 ppm or less as an o-dichlorobenzene-equivalent value based on gas chromatography analysis with o-dichlorobenzene as a standard substance. The "content of chlorobenzene-soluble components in the pre-crystallization shaping material" can be measured by the method described in detail in the "Amount of chlorobenzene-soluble components" section of the description pertaining to 1) the shaping material, and preferred content ranges therefor are also the same as set forth above. Production efficiency of the semiconductor container can be improved when the content of chlorobenzene-soluble components in the pre-crystallization shaping material is 1,000 ppm or less. Moreover, in a situation in which the obtained semiconductor container is used, contamination of contents of the semiconductor container, such as a wafer, due to outgas evolved from the semiconductor container can be inhibited and the yield in semiconductor production can be improved when the content of chlorobenzene-soluble components in the pre-crystallization shaping material is 1,000 ppm or less.

The presently disclosed method of producing a semiconductor container including the various steps set forth above may, for example, be a shaping method that is the same as any of the various shaping methods given as examples in the "Shaping method of shaping material" section of "1) Shaping material". Of these methods, injection molding is preferably adopted in the method of producing a semiconductor container.

In a case in which the presently disclosed method of producing a semiconductor container is an injection molding method, the lower limit of the crystallization temperature range can be controlled by adjusting the temperature of a mold (for example, a metal mold) used in injection molding. In other words, the target semiconductor container can be obtained by heating the mold used in injection molding to (Tm−140°) C. or higher, preferably (Tm−135°) C. or higher, and more preferably (Tm−120°) C. or higher, subsequently injecting the molten pre-crystallization shaping material, holding for a specific time, and then removing the product from the mold. Note that the temperature of the mold used in injection molding may be lower than the melting point Tm (° C.). For example, the semiconductor container can be obtained by, in injection molding using a metal mold, injecting the pre-crystallization shaping material into the metal mold while in a molten state, shaping the shaping material into a desired shape inside the mold while holding the shaping material in a crystallization temperature range of not lower than (Tm−140°) C. and lower than the melting point Tm (° C.) to cause crystallization of the shaping material, and subsequently removing the product from the mold.

EXAMPLES

The following provides a more specific description of the present disclosure based on examples. However, the present disclosure is not limited to the following examples. In the following description, "%" and "parts" used in expressing quantities are by mass, unless otherwise specified. Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer. Note that pressures in the following description are gauge pressures.

The following methods were used to measure various physical properties in the examples and comparative examples.

(1) Molecular Weight (Weight-Average Molecular Weight and Number-Average Molecular Weight) of Ring-Opened Polymer Each produced solution containing a ring-opened polymer was sampled to obtain a measurement sample. The obtained measurement sample was used to determine the molecular weight of the ring-opened polymer as a polystyrene-equivalent value using an H-type column (produced by Tosoh Corporation) in a gel permeation chromatography (GPC) system HLC-8320 (produced by Tosoh Corporation) at a temperature of 40° C. and with tetrahydrofuran as a solvent.

(2) Percentage Hydrogenation in Hydrogenation Reaction

The percentage hydrogenation in a hydrogenation reaction was determined by $^1$H-NMR measurement using orthodichlorobenzene-$d_4$ as a solvent.

(3) Glass-Transition Temperature and Melting Point of Alicyclic Structure-Containing Resin A produced alicyclic structure-containing resin was used as a measurement sample. The measurement sample was heated to 320° C. under a nitrogen atmosphere and was then rapidly cooled to room temperature at a cooling rate of $-10°$ C./min using liquid nitrogen. A differential scanning calorimeter (DSC) was used to heat the measurement sample at 10° C./min and determine the glass-transition temperature and melting point of the alicyclic structure-containing resin.

(4) Proportion of Racemo Diads in Alicyclic Structure-Containing Resin

A produced alicyclic structure-containing resin was used as a measurement sample. The proportion of racemo diads was determined by performing $^{13}$C-NMR measurement by an inverse-gated decoupling method at 200° C. with orthodichlorobenzene-$d_4$/1,2,4-trichlorobenzene-$d_3$ (TCB-$d_3$) (mixing ratio (by mass): 1/2) as a solvent. Specifically, the proportion of racemo diads was determined based on an intensity ratio of a signal at 43.35 ppm attributed to meso diads and a signal at 43.43 ppm attributed to racemo diads with a peak at 127.5 ppm for orthodichlorobenzene-$d_4$ taken as a standard shift.

(5) Amount of Chlorobenzene-Soluble Components (Originating from Cyclohexane/Toluene)

A produced shaping material was immersed in chlorobenzene and orthodichlorobenzene was also added as an internal standard to obtain an immersion liquid. The immersion liquid containing the shaping material was stirred for 3 hours at 140° C. in order that chlorobenzene-soluble components contained in the shaping material were extracted into the chlorobenzene. The obtained extract was measured by a gas chromatograph under the following conditions and the amount of chlorobenzene-soluble components in the specimen was determined from an area ratio of peaks attributed to chlorobenzene-soluble components and an internal standard peak. Note that the chlorobenzene-soluble components contained in the shaping material were components originating from solvent components such as cyclohexane and toluene used in synthesis of the alicyclic structure-containing resin.

In Table 2, the amount of a chlorobenzene-soluble component calculated based on a peak corresponding to cyclohexane is indicated in a row for component A and the amount of a chlorobenzene-soluble component calculated based on a peak corresponding to methylcyclohexane (hydrogenated product of toluene contained in polymerization catalyst solution) is indicated in a row for component B.

Moreover, in Tables 5 and 7, the amount of chlorobenzene-soluble components indicates the amount of all chlorobenzene-soluble components contained in the shaping material (substantially equivalent to the amount of components calculated based on both a peak corresponding to cyclohexane and a peak corresponding to methylcyclohexane).

<Gas Chromatograph Measurement Conditions>

Apparatus: HP6850A produced by The Hewlett-Packard Company (thermal conductivity detector)

Column: HP1 (internal diameter: 0.32 mm; length: 30 m; film thickness: 0.25 μm)

Oven temperature conditions: Held at 40° C. for 6 minutes, subsequently raised to 240° C. at a heating rate of 10° C./min, and then raised to 300° C. at a heating rate of 30° C./min Injection port temperature: 160° C.

Interface: 250° C.

Pressure: 58.6 kPa (6) Crystallization Peak Temperature

A differential scanning calorimeter (DSC) was used to heat pellets (shaping material) to 320° C. under a nitrogen atmosphere and then cool the pellets to 40° C. while determining a peak temperature associated with crystallization. A shaping material having a higher crystallization peak temperature readily crystallizes in a higher temperature region and has better crystallinity.

(7) Formability

Specimens for flexural modulus measurement were produced by altering the cooling time of a mold when obtaining injection molded items through shaping of a shaping material. The presence of deformation in each specimen was checked after the specimen had been removed from the mold. Formability of the shaping material was then evaluated by the following standard.

A: Specimen without deformation obtained with cooling time of less than 20 seconds B: Specimen without deformation obtained with cooling time of not less than 20 seconds and less than 30 seconds C: Specimen without deformation obtained with cooling time of not less than 30 seconds and less than 40 seconds D: Specimen without deformation obtained with cooling time of 40 seconds or more (8) Flexural Modulus An obtained shaping material was shaped, was loaded into a small-size injection molding machine (Micro Injection Molding Machine 10 cc produced by DSM Xplore), and was injection molded under conditions of a molding temperature of 290° C., an injection pressure of 0.7 MPa, and a mold temperature of 170° C. to produce a specimen for flexural modulus measurement having a length of 80 mm, a width of 10 mm, and a thickness of 4 mm. The cooling time of the mold when obtaining this specimen was 60 seconds. The flexural modulus was measured by using the obtained specimen to perform a flexural test in accordance with JIS K7171 at a test rate of 2 mm/min using an AUTOGRAPH (product name: AGS-5kNJ TCR2; produced by Shimadzu Corporation). A shaping material having a high flexural modulus has high mechanical strength.

(9) Water Resistance of Cosmetic Container

Cosmetic containers produced in Example 2 and Comparative Example 2 were each weighed to determine the mass $W_0$ of the container, and then 5 mL of purified water was added into the cosmetic container and was left for 1 week at 50° C. with a lid on the cosmetic container. Thereafter, the purified water in the container was disposed of, the container was dried, and the mass $W_1$ of the container after drying was weighed. The percentage mass loss was calculated by a formula: $(W_0-W_1)/W_0 \times 100$. Water resistance was evaluated by the following standard.

A: Percentage mass loss of less than 0.1%

B: Percentage mass loss of not less than 0.1% and less than 1.0%

C: Percentage mass loss of not less than 1.0% and less than 5.0%

D: Percentage mass loss of not less than 5.0% and less than 10%

E: Percentage mass loss of 10% or more

Note that evaluations of A to C in the water resistance test and the chemical resistance test described below indicate adequate performance as a cosmetic container.

(10) Chemical Resistance of Cosmetic Container

Chemical resistance was evaluated by the same standard as for the water resistance test with the exception that ethanol, glycerin, oleic acid, and liquid paraffin were used instead of the purified water in the water resistance test described above.

(11) Ease of Wiping Off Oil Content from Cosmetic Container

Skin cream (product name: Nivea Creme; produced by Nivea-Kao Co., Ltd.) was applied onto the surfaces of cosmetic containers produced in Example 2 and Comparative Example 2 and was left for 48 hours at 25° C.

The skin cream was then wiped off using dry cotton for cosmetics and the condition of the surface at this time was inspected. Ease of wiping off oil content was evaluated by the following standard.

A: Easily removed without a stain remaining on the surface

B: Difficult to remove by wiping and a stain tends to remain on the surface

(12) Degree of Crystallinity

A specimen was obtained by cutting out 20 mm×20 mm from a smooth surface of a semiconductor container obtained in each of Example 3 and Comparative Example 3. The degree of crystallinity of the obtained specimen was measured by an X-ray diffractometer (D8 DISCOVER produced by Bruker Corporation).

(13) Chemical Resistance

Specimens were obtained by cutting out 20 mm×20 mm from a smooth surface of a semiconductor container obtained in each of Example 3 and Comparative Example 3. The specimens were each weighed to obtain the pre-immersion mass $W_0$. The obtained specimens were then immersed in chemicals under conditions shown in Table 1 and were then each weighed to obtain the post-immersion mass $W_1$. Note that HC-FX50 produced by Tosoh Corporation was used as an oil/fat cleaning agent.

The percentage mass loss was calculated from the pre-immersion mass and the post-immersion mass of the specimen by a formula: $(W_0-W_1)/W_0 \times 100$, and was evaluated by the following standard.

A: Percentage mass loss of less than 0.1%

B: Percentage mass loss of not less than 0.1% and less than 0.2%

C: Percentage mass loss of 0.2% or more

TABLE 1

| Chemical | Temperature (° C.) | Time (min) |
|---|---|---|
| Hydrofluoric acid/nitric acid/ acetic acid mixed solution (mass ratio 1:3:8) | 25 | 10 |
| 25% NaOH aqueous solution | 40 | 10 |
| Oil/fat cleaning agent | 40 | 10 |

(14) Amount of Outgas

A sample was obtained by cutting out 20 mm×20 mm of a smooth surface of a semiconductor container obtained in each of Example 3 and Comparative Example 3. A sample container made of a glass tube of 4 mm in internal diameter into which the specimen had been placed and a gas collection tube cooled by liquid nitrogen were connected, the sample container was heated for 30 minutes at 180° C. in a stream of high-purity helium (helium purity: 99.99995 volume %), and gas evolved from the sample was continuously collected in the gas collection tube. Thermal desorption gas chromatography mass spectrometry of the collected gas was performed using n-decane as an internal standard and the amount of gas evolved from the sample was calculated as an n-decane-equivalent value.

This analysis was performed using the following apparatus and analysis conditions.

[Thermal Desorption]

Apparatus: TDS A2 produced by Gerstel K.K. Japan

Sample heating conditions: 180° C., 30 minutes

Helium gas flow rate: 30 mL/min

Gas collection tube: Tube of 1 mm in diameter packed with glass wool

Temperature of gas collection tube: −130° C. (during gas collection), 280° C. (during gas release)

[Gas Chromatography]

Apparatus: 6890N produced by Agilent Technologies, Inc.

Column: HP-5 ms (0.25×30 m, df=0.25 μm) produced by Agilent Technologies, Inc.

Carrier gas flow rate: 1 mL/min

Column pressure: None (flow control)

Heating profile: Held at 40° C. for 3 minutes, subsequently raised to 280° C. at a heating rate of 10° C./min, and then held at 280° C. for 10 minutes

[Mass Spectrometer]

Apparatus: 5973N produced by Agilent Technologies, Inc.

(15) Heat Resistance

A wafer that had been heated to 180° C. was placed in the semiconductor container obtained in each of Example 3 and Comparative Example 3 and was left until the wafer temperature reached 25° C.

The semiconductor container was inspected by eye before and after the wafer was left, and heat resistance was evaluated in accordance with the following standard.

A: No change in shape or color of semiconductor container observed

B: Slight change in shape and/or color of semiconductor container observed

C: Change in shape and/or color of semiconductor container observed

Example 1 and Comparative Example 1

Production Example A

[Production of Alicyclic Structure-Containing Resin (A)]

A metal pressure-resistant reactor that had been internally purged with nitrogen was charged with 154.5 parts of cyclohexane as an organic solvent, 42.8 parts (30 parts in terms of dicyclopentadiene) of a cyclohexane solution (concentration: 70%) of dicyclopentadiene (endo isomer content ratio: 99% or more) as a dicyclopentadiene, and 1.9 parts of 1-hexene as a molecular weight modifier. The contents of the pressure-resistant reactor were heated to 53° C. Meanwhile, a ring-opening polymerization catalyst solution was prepared by adding 0.061 parts of an n-hexane solution (concentration: 19%) of diethylaluminum ethoxide (organometallic reducing agent) as a ring-opening polymerization catalyst to a solution obtained through dissolution of 0.014 parts of a tetrachlorotungsten phenylimide (tetrahydrofuran) complex (metal compound) as a ring-opening polymerization catalyst in 0.70 parts of toluene (organic solvent), and then performing mixing for 10 minutes. This ring-opening polymerization catalyst solution was added into the reactor and a ring-opening polymerization reaction was carried out for 4 hours at 53° C. to obtain a solution containing a dicyclopentadiene ring-opened polymer.

The polymerization reaction was stopped by adding 0.037 parts of 1,2-ethanediol as an inhibitor to 200 parts of the obtained solution containing the dicyclopentadiene ring-opened polymer and performing stirring for 1 hour at 60° C. Thereafter, 1 part of a hydrotalcite-like compound (product name: KYOWAAD® 2000 (KYOWAAD is a registered trademark in Japan, other countries, or both); produced by Kyowa Chemical Industry Co., Ltd.) was added as an adsorbent, heating was performed to 60° C., and stirring was performed for 1 hour. Next, 0.4 parts of a filter aid (product name: Radiolite® #1500 (Radiolite is a registered trademark in Japan, other countries, or both); produced by Showa Chemical Industry Co., Ltd.) was added and the adsorbent was filtered off using a PP pleated cartridge filter (product name: TCP-HX; produced by Toyo Roshi Kaisha, Ltd.) to obtain a solution containing the dicyclopentadiene ring-opened polymer.

A portion of this solution was used to measure the molecular weight of the dicyclopentadiene ring-opened polymer. The weight-average molecular weight (Mw) was 28,100, the number-average molecular weight (Mn) was 8,750, and the molecular weight distribution (Mw/Mn) was 3.21.

Next, 100 parts of cyclohexane and 0.0043 parts of chlorohydridocarbonyltris(triphenylphosphine)ruthenium were added to 200 parts of the obtained solution containing the dicyclopentadiene ring-opened polymer (polymer content: 30 parts), and a hydrogenation reaction was carried out for 4 hours at a hydrogen pressure of 6 MPa and a temperature of 180° C. The reaction liquid was a slurry in which solid content had precipitated.

Solid content and solution were separated through centrifugal separation of the reaction liquid and then the solid content was dried under reduced pressure at 60° C. for 24 hours to obtain 28.5 parts of a hydrogenated dicyclopentadiene ring-opened polymer (alicyclic structure-containing resin (A)).

The percentage hydrogenation of unsaturated bonds in the hydrogenation reaction was 99% or more. The hydrogenated dicyclopentadiene ring-opened polymer had a glass-transition temperature of 98° C. and a melting point of 262° C. The proportion of racemo diads was 89%.

[Production of Shaping Material (1-1)]
—Purification Step—
The alicyclic structure-containing resin (A) obtained as described above was used as a target resin and was dried under a nitrogen atmosphere (inert gas atmosphere) at a purification temperature of 200° C. for a purification time of 24 hours to obtain a purified alicyclic structure-containing resin (A) (i.e., a purified target resin).
—Shaping Step of Pelletized Shaping Material—
A mixture was obtained by mixing 0.8 parts of an antioxidant (tetrakis[methylene-3-(3',5'-di-t-butyl-4'-hydroxyphenyl)propionate]methane; product name: Irganox® 1010 (Irganox is a registered trademark in Japan, other countries, or both); produced by BASF Japan Ltd.) relative to 100 parts of the purified alicyclic structure-containing resin (A) obtained in the purification step, and was loaded into a twin screw extruder (TEM-37B produced by Toshiba Machine Co., Ltd.). The mixture was hot melt-extruded and was shaped into a strand-form shaped product that was subsequently cut by a strand cutter to obtain a pelletized shaping material (1-1).

The operating conditions of the twin screw extruder were as follows.
Barrel temperature setting: 270° C. to 280° C.
Die temperature setting: 250° C.
Screw rotation speed: 145 rpm
Feeder rotation speed: 50 rpm Example 1-1

The pelletized shaping material (1-1) obtained according to Production Example A was used to measure or evaluate the amount of chlorobenzene-soluble components, the crystallization peak temperature, formability, and the flexural modulus as previously described. The results are shown in Table 2.

Examples 1-2 and 1-3 and Comparative Examples 1-1 to 1-3

An alicyclic structure-containing resin (A) obtained according to the method described in the "Production of alicyclic structure-containing resin (A)" section of Production Example A was purified with the purification temperature and purification time shown in Table 2. Measurements and evaluations were made in the same manner as in Example 1-1. The results are shown in Table 2.

TABLE 2

|  |  |  | Example 1 | | | Comparative Example 1 | | |
| --- | --- | --- | --- | --- | --- | --- | --- | --- |
|  |  |  | 1 | 2 | 3 | 1 | 2 | 3 |
| Type of crystalline alicyclic structure-containing resin |  |  | A | A | A | A | A | A |
| Production process | Purification conditions | Atmosphere | Nitrogen | Nitrogen | Nitrogen | Nitrogen | Nitrogen | Nitrogen |
|  |  | Purification temperature (° C.) | 200 | 170 | 150 | 100 | 130 | 100 |
|  |  | Purification time (hr) | 24 | 10 | 10 | 10 | 10 | 48 |
| Shaping material | Amount of chlorobenzene-soluble components | Component A (ppm) | 30 | 400 | 500 | 1000 | 800 | 400 |
|  |  | Component B (ppm) | 30 | 100 | 400 | 1000 | 400 | 700 |
|  |  | Total (ppm) | 60 | 500 | 900 | 2000 | 1200 | 1100 |

TABLE 2-continued

| | | Example 1 | | | Comparative Example 1 | | |
|---|---|---|---|---|---|---|---|
| | | 1 | 2 | 3 | 1 | 2 | 3 |
| | Crystallization peak temperature (° C.) | 185 | 181 | 175 | 165 | 168 | 167 |
| Evaluation | Formability | A | A | B | D | C | C |
| | Flexural modulus (MPa) | 2800 | 2780 | 2710 | 2420 | 2510 | 2490 |

It can be seen from Table 2 that the shaping materials according to Examples 1-1 to 1-3, which each contained a crystalline alicyclic structure-containing resin (A) having a melting point of 200° C. or higher and had a content of chlorobenzene-soluble components of 1,000 ppm or less as measured by the prescribed method, had excellent formability. On the other hand, it can be seen that formability was inadequate in the case of the shaping materials according to Comparative Examples 1-1 to 1-3 in which the same crystalline alicyclic structure-containing resin (A) as in Examples 1-1 to 1-3 was used, but different purification conditions were adopted and the content of chlorobenzene-soluble components exceeded 1,000 ppm.

Example 2 and Comparative Example 2

An alicyclic structure-containing resin (A) and a shaping material (1-1) containing this alicyclic structure-containing resin (A) that were obtained according to the previously described Production Example A, and alicyclic structure-containing resins (B) to (F) and shaping materials (2-2) to (2-9) containing these alicyclic structure-containing resins (B) to (F) that were obtained as described below were used in Example 2 and Comparative Example 2.

[Production of Alicyclic Structure-Containing Resin (B)]

The alicyclic structure-containing resin (B) was produced in the same manner as in the method described in the "Production of alicyclic structure-containing resin (A)" section of Production Example A with the exception that the amount of tetrachlorotungsten phenylimide (tetrahydrofuran) complex used as a ring-opening polymerization catalyst was changed to 0.038 parts.

[Production of Alicyclic Structure-Containing Resin (C)]

The alicyclic structure-containing resin (C) was produced in the same manner as in the method described in the "Production of alicyclic structure-containing resin (A)" section of Production Example A with the exception that the amount of tetrachlorotungsten phenylimide (tetrahydrofuran) complex used as a ring-opening polymerization catalyst was changed to 0.053 parts.

[Production of Alicyclic Structure-Containing Resin (D)]

The alicyclic structure-containing resin (D) was produced according to a method described in "Production Example 1" of JP 2015-160399 A.

The specific procedure was as follows.

In a reactor, 0.82 parts of 1-hexene, 0.15 parts of dibutyl ether, and 0.30 parts of triisobutylaluminum were added to 500 parts of dehydrated cyclohexane at room temperature under a nitrogen atmosphere and were mixed therewith. Thereafter, 76 parts of dicyclopentadiene (DCPD), 70 parts of 8-methyl-tetracyclo[4.4.0.1$^{2,5}$.1$^{7,10}$]dodec-3-ene (TCD), 54 parts of tetracyclo[7.4.0.0$^{2,7}$.1$^{10,13}$]tridec-2,4,6,11-tetraene (MTF), and 80 parts of tungsten hexachloride (0.7% toluene solution) were continuously added over 2 hours, concurrently to one another, while maintaining the temperature at 45° C. to carry out polymerization. Next, 1.06 parts of butyl glycidyl ether and 0.52 parts of isopropyl alcohol were added to the polymerization solution to deactivate the polymerization catalyst and stop the polymerization reaction. The polymerization conversion rate of monomers determined by analyzing the obtained reaction solution containing a ring-opened polymer by gas chromatography was 99.5%.

Next, 270 parts of cyclohexane was added to 100 parts of the obtained reaction solution containing the ring-opened polymer, 5 parts of diatomaceous earth-supported nickel catalyst (proportion of supported nickel: 58 mass %; pore volume: 0.25 mL/g; specific surface area: 180 m$^2$/g) was further added as a hydrogenation catalyst, the pressure was raised to 5 MPa with hydrogen and the temperature was raised to 200° C. under stirring, and then a reaction was carried out for 8 hours to obtain a reaction solution containing a hydrogenated DCPD/TCD/MTF ring-opened copolymer. The hydrogenation catalyst was removed by filtration and then cyclohexane (solvent) and other volatile components were removed from the solution at a temperature of 270° C. and a pressure of 1 kPa using a cylindrical evaporator (produced by Hitachi, Ltd.). Next, the hydrogenated product was extruded from an extruder in a molten state as strands that were subsequently cooled and then pelletized to obtain pellets. The pelletized hydrogenated ring-opened copolymer (alicyclic structure-containing resin (D)) had a Mw of 34,000, a percentage hydrogenation of 99% or more, and a glass-transition temperature of 135° C.

[Production of Alicyclic Structure-Containing Resin (E)]

The alicyclic structure-containing resin (E) was produced according to a method described in "Production Example 1" of JP 2008-137671 A.

The specific procedure was as follows.

In a reactor, 0.55 parts by mass of 1-hexene, 0.30 parts by mass of diisopropyl ether, 0.20 parts by mass of triisobutylaluminum, and 0.075 parts by mass of isobutyl alcohol were added to 500 parts by mass of dehydrated cyclohexane at room temperature under a nitrogen atmosphere and were mixed therewith. Thereafter, 250 parts by mass of 2-norbornene (2-NB) and 15 parts by mass of a 1.0 mass % toluene solution of tungsten hexachloride were continuously added over 2 hours while maintaining the temperature at 55° C. to carry out polymerization. The obtained ring-opened polymer had a weight-average molecular weight (Mw) of 83,000 and a molecular weight distribution (Mw/Mn) of 1.8.

The polymerization reaction liquid containing the ring-opened polymer that was obtained as described above was transferred to a pressure-resistant hydrogenation reactor and 0.5 parts by mass of a diatomaceous earth-supported nickel catalyst (T8400 produced by Nissan Sud-Chemie; proportion of supported nickel: 58 mass %) was added thereto. A reaction was carried out for 6 hours at a temperature of 160° C. and a hydrogen pressure of 4.5 MPa. The solution was filtered with diatomaceous earth as a filter aid using a filtration device that included a stainless steel screen to remove the catalyst.

The obtained reaction solution was poured into 3,000 parts by mass of isopropyl alcohol under stirring to cause precipitation of the hydrogenated product. The hydrogenated product was collected by filtration, was washed with 500 parts by mass of acetone, and was then dried for 48 hours at $0.13 \times 10^3$ Pa in a vacuum dryer set to 100° C. to obtain 190 parts by mass of the alicyclic structure-containing resin (E). The obtained alicyclic structure-containing resin (E) had a percentage hydrogenation of 99% or more, a weight-average molecular weight (Mw) of 82,200, a molecular weight distribution (Mw/Mn) of 2.9, and a melting point of 140° C.

[Production of Alicyclic Structure-Containing Resin (F)]

After 0.0068 parts of a molybdenum compound indicated by the following general formula (X) had been added into a glass reactor equipped with a stirrer, 24 parts of cyclohexane, 6 parts of dicyclopentadiene, and 0.00573 parts of 1-hexene were added, and a polymerization reaction was carried out at room temperature.

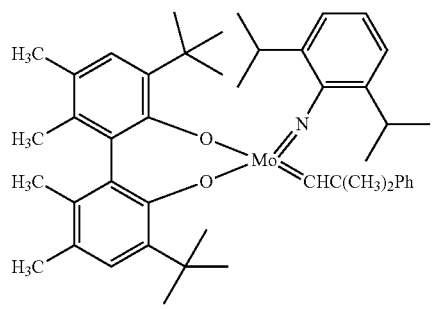

(X)

The polymerization reaction liquid obtained after 3 hours of this polymerization reaction was poured into an excess of isopropanol. The polymer was caused to completely precipitate, and was then filtered off and washed. The obtained filtration residue was dried under reduced pressure at 40° C. for 40 hours. The obtained ring-opened polymer had a weight-average molecular weight (Mw) of 103,000 and a number-average molecular weight (Mn) of 37,000.

Next, an autoclave equipped with a stirrer was charged with 5.0 parts of the ring-opened polymer obtained as described above and 88 parts of cyclohexane. A hydrogenation catalyst solution containing 0.031 parts of bis(tricyclohexylphosphine)benzylidene ruthenium(IV) dichloride and 1.8 parts of ethyl vinyl ether dissolved in 18 parts of cyclohexane was subsequently added and a hydrogenation reaction was carried out for 10 hours at a hydrogen pressure of 0.785 MPa and a temperature of 120° C. After this reaction, the reaction liquid was poured into an excess of isopropanol. The polymer was caused to completely precipitate, and was then filtered off and washed. The obtained filtration residue was dried under reduced pressure at 40° C. for 40 hours. The percentage hydrogenation was 99% or more. The obtained alicyclic structure-containing resin (F) had a melting point of 272° C. and a glass-transition temperature of 102° C.

Physical properties of the alicyclic structure-containing resins (A) to (F) obtained as described above are shown in Table 3. Note that the percentage content of DCPD in Table 3 indicates the percentage content (mass %) of dicyclopentadiene units when all repeating units included in the alicyclic structure-containing resin are taken to be 100 mass %.

TABLE 3

| | Alicyclic structure-containing resin | | | | | |
|---|---|---|---|---|---|---|
| | (A) | (B) | (C) | (D) | (E) | (F) |
| Percentage content of DCPD (mass %) | 100 | 100 | 100 | 38 | 0 | 100 |
| Melting point (° C.) | 262 | 260 | 256 | — | 140 | 272 |
| Glass-transition temperature (° C.) | 98 | 97 | 96 | 135 | −5 | 102 |
| Proportion of racemodiads (%) | 89 | 77 | 68 | — | — | 5 |

[Production of Shaping Materials (2-2) to (2-9)]

The shaping materials (2-2) to (2-9) were obtained through the same procedure as that described in "Production of shaping material (1-1)" with the exception that the alicyclic structure-containing resins and additives indicated in Table 4 were used.

The additives used in production of these shaping materials were as follows.

Antioxidant (A): Tetrakis[methylene-3-(3',5'-di-t-butyl-4'-hydroxyphenyl)propionate]methane; Irganox® 1010 (product name) produced by BASF Japan Ltd.

Antioxidant (B): Pentaerythritol tetrakis[3-(3,5-di-t-butyl-4-hydroxyphenyl)propionate]; Irganox® L101 (product name) produced by BASF Japan Ltd.

Crystal nucleating agent: Sodium 2,2'-methylenebis(4,6-di-tert-butylphenyl) phosphate: ADK STAB® NA-11 (ADK STAB is a registered trademark in Japan, other countries, or both) (product name) produced by ADEKA Corporation Wax: Paraffin wax; LUVAX-1266 (product name) produced by Nippon Seiro Co., Ltd.

Thermoplastic elastomer: Block copolymer including aromatic vinyl compound-based polymer block and isobutylene-based polymer block (polymer obtained according to method described in Production Example 4 of JP 2015-160399 A)

TABLE 4

| | | Shaping material | | | | | | | | |
|---|---|---|---|---|---|---|---|---|---|---|
| | | (1-1) | (2-2) | (2-3) | (2-4) | (2-5) | (2-6) | (2-7) | (2-8) | (2-9) |
| Alicyclic | (A) | 100 | — | — | 100 | 100 | — | — | — | — |
| structure- | (B) | — | 100 | — | — | — | — | — | — | — |
| containing | (C) | — | — | 100 | — | — | — | — | — | — |
| resin (parts) | (D) | — | — | — | — | — | 100 | 100 | — | — |
| | (E) | — | — | — | — | — | — | — | 100 | — |
| | (F) | — | — | — | — | — | — | — | — | 100 |

TABLE 4-continued

|  |  | Shaping material | | | | | | | | |
|---|---|---|---|---|---|---|---|---|---|---|
|  |  | (1-1) | (2-2) | (2-3) | (2-4) | (2-5) | (2-6) | (2-7) | (2-8) | (2-9) |
| Additives | Antioxidant (A) | 0.8 | 0.8 | 0.8 | 0.8 | 0.8 | 0.8 | 0.8 | 0.8 | — |
|  | Antioxidant (B) | — | — | — | — | — | — | — | — | — |
|  | Crystal nucleating agent | — | — | — | 0.4 | 0.2 | — | — | — | — |
|  | Wax | — | — | — | — | 2 | — | — | — | — |
|  | Thermoplastic elastomer | — | — | — | — | — | — | — | — | — |
| Purification atmosphere | | Nitrogen | Nitrogen | Nitrogen | Nitrogen | Nitrogen | Nitrogen | Nitrogen | Nitrogen | Nitrogen |
| Purification temperature (° C.) | | 200 | 200 | 200 | 200 | 200 | 200 | 200 | 200 | 200 |
| Purification time (hr) | | 24 | 24 | 24 | 24 | 24 | 24 | 24 | 24 | 24 |

Example 2-1

The pelletized shaping material (1-1) obtained as described above was used to perform injection molding in an injection molding machine (ROBOSHOT α100B produced by FANUC) with conditions of a shaping temperature of 280° C., a mold temperature of 160° C., and a cooling time of resin in the mold of 60 seconds to produce a jar-type cosmetic container having an internal capacity of 10 mL. Water resistance, chemical resistance, and ease of wiping off oil content were evaluated for the produced cosmetic container as previously described. The results are shown in Table 5.

Examples 2-2 to 2-6 and Comparative Examples 2-1 to 2-4

The same operations as in Example 2-1 were performed with respect to the shaping materials (2-2) to (2-9) that were obtained as previously described. However, the shaping conditions were changed as indicated in Table 5. With the exception of in Comparative Example 2-4, a cosmetic container was obtained. The obtained cosmetic container was evaluated in the same manner as in Example 2-1. The results are shown in Table 5.

In Comparative Example 2-4, however, a cosmetic container could not be produced because progression of crystallization in injection molding was too slow. For the alicyclic structure-containing resin (F) used in Comparative Example 2-4, the hydrogenated product was filtered and the resultant filtration residue was dried under reduced pressure at 40° C. for 40 hours in production as previously described. However, volatile impurities could not be completely removed by drying under these conditions and the shaping material (2-9) containing the alicyclic structure-containing resin (F) had a large amount of residual components (refer to Table 5).

TABLE 5

|  |  | Example 2 | | | | | | Comparative Example 2 | | | |
|---|---|---|---|---|---|---|---|---|---|---|---|
|  |  | 1 | 2 | 3 | 4 | 5 | 6 | 1 | 2 | 3 | 4 |
| Shaping material | Type | (1-1) | (2-2) | (2-3) | (1-1) | (2-4) | (2-5) | (2-6) | (2-7) | (2-8) | (2-9) |
|  | Amount of chlorobenzene-soluble components (ppm) | 60 | 140 | 100 | 60 | 70 | 70 | 50 | 80 | 900 | 2000 |
| Shaping conditions | Mold temperature (° C.) | 160 | 160 | 160 | 80 | 145 | 150 | 80 | 80 | 120 | 160 |
|  | Holding time (s) | 60 | 60 | 60 | 60 | 60 | 60 | 60 | 60 | 60 | 60 |
| Evaluation | Water resistance | A | A | A | A | A | A | A | A | A | — |
|  | Chemical resistance — Ethanol | B | B | B | B | B | A | B | B | E | — |
|  | Chemical resistance — Glycerin | A | B | B | B | A | A | B | A | B | — |
|  | Chemical resistance — Oleic acid | A | B | C | B | A | A | E | D | A | — |
|  | Chemical resistance — Liquid paraffin | B | C | C | B | A | A | E | E | B | — |
|  | Ease of wiping off oil content | A | A | A | A | A | A | B | B | B | — |

The following findings can be made from Tables 3 to 5. Firstly, the cosmetic containers according to Examples 2-1 to 2-6, which were each obtained using a shaping material that satisfied the prescribed properties, had excellent water resistance, chemical resistance, and ease of wiping off oil content. In particular, it can be seen through comparison of Examples 2-1 and 2-4 that chemical resistance can be increased by increasing the mold temperature in injection molding. On the other hand, the cosmetic containers of Comparative Examples 2-1 and 2-2 had poor chemical resistance and ease of wiping off oil content because they contained an amorphous alicyclic structure-containing resin (D). Moreover, the cosmetic container of Comparative Example 2-3 contained a crystalline alicyclic structure-containing resin (E) but the melting point thereof (140° C.) was not high. As a result, the obtained cosmetic container was easily eroded by ethanol and had poor ease of wiping off oil content.

Comparative Example 2, these additives were compounded with the alicyclic structure-containing resins (A) to (F) in the ratios shown in Table 6, and purification was carried out under purification conditions shown in Table 6. Note that a purification step was not implemented in production of the shaping materials (3-8) and (3-10).

TABLE 6

|  |  | Shaping material | | | | | | | | | |
|---|---|---|---|---|---|---|---|---|---|---|---|
|  |  | (3-1) | (3-2) | (3-3) | (3-4) | (3-5) | (3-6) | (3-7) | (3-8) | (3-9) | (3-10) |
| Alicyclic structure-containing resin (parts) | (A) | 100 | — | — | 100 | 100 | — | — | — | — | 100 |
|  | (B) | — | 100 | — | — | — | — | — | — | — | — |
|  | (C) | — | — | 100 | — | — | — | — | — | — | — |
|  | (D) | — | — | — | — | — | 100 | — | — | — | — |
|  | (E) | — | — | — | — | — | — | 100 | — | — | — |
|  | (F) | — | — | — | — | — | — | — | 100 | 100 | — |
| Additives (parts) | Antioxidant (A) | 0.8 | 0.8 | 0.8 | 0.8 | 0.8 | 0.8 | 0.8 | — | — | 0.8 |
|  | Antioxidant (B) | — | — | — | — | — | — | — | 0.2 | 0.2 | — |
|  | Crystal nucleating agent | — | — | — | 0.4 | — | — | — | — | — | — |
|  | Conductive agent | — | — | — | — | 10 | — | — | — | — | — |
| Purification atmosphere | | Air | Air | Air | Air | Air | Air | Air | — | Air | — |
| Purification temperature (° C.) | | 200 | 200 | 200 | 200 | 200 | 200 | 200 | — | 200 | — |
| Purification time (hr) | | 24 | 24 | 24 | 24 | 24 | 24 | 24 | — | 24 | — |

Example 3 and Comparative Example 3

An alicyclic structure-containing resin (A) obtained according to the previously described Production Example A, a shaping material (3-1) containing the alicyclic structure-containing resin (A), alicyclic structure-containing resins (B) to (F) obtained in the same way as in Example 2 and Comparative Example 2, and shaping materials (3-2) to (3-10) containing these alicyclic structure-containing resins (B) to (F) were used in Example 3 and Comparative Example 3.

In production of the shaping materials (3-1) to (3-10), a conductive agent shown below was used in addition to an antioxidant (A), an antioxidant (B), and a crystal nucleating agent that were the same as those used in the "Production of shaping materials (2-2) to (2-9)" section of Example 2 and

Example 3-1

The shaping material (3-1) obtained as described above was melted at a shaping temperature of 280° C. and was used to perform injection molding in an injection molding machine (ROBOSHOT α100B produced by FANUC) under conditions of a mold temperature of 160° C. and a holding time of resin in the mold of 60 seconds to produce a semiconductor container for a wafer size of 300 mm. Various evaluations of the obtained semiconductor container were performed according to the previously described methods. The results are shown in Table 7.

Example 3-2 to Comparative Example 3-4

A semiconductor container was produced in the same way as in Example 3-1 with the exception that injection molding was performed under the conditions (mold temperature and holding time) shown in Table 7. Various evaluations of the obtained semiconductor container were performed according to the previously described methods. The results are shown in Table 7. Note that in Comparative Examples 3-3 and 3-4, it was not possible to obtain a shaped item with the mold temperature set as 160° C. and the holding time set as 300 seconds.

TABLE 7

|  |  | Example 3 |  |  |  |  |  |  | Comparative Example 3 |  |  |  |
|---|---|---|---|---|---|---|---|---|---|---|---|---|
|  |  | 1 | 2 | 3 | 4 | 5 | 6 | 7 | 1 | 2 | 3 | 4 |
| Shaping material | Type | (3-1) | (3-2) | (3-3) | (3-1) | (3-4) | (3-5) | (3-9) | (3-6) | (3-7) | (3-8) | (3-10) |
|  | Amount of chlorobenzene-soluble components (ppm) | 60 | 140 | 100 | 60 | 70 | 80 | 90 | 120 | 140 | 2000 | 1500 |
| Shaping conditions | Mold temperature (° C.) | 160 | 160 | 160 | 130 | 160 | 160 | 160 | 130 | 40 | 160 | 160 |
|  | Holding time (s) | 60 | 60 | 60 | 60 | 60 | 60 | 60 | 60 | 60 | 300 | 300 |
| Evaluation | Degree of crystallinity (%) | 30 | 30 | 30 | 10 | 30 | 30 | 30 | 0 | 30 | — | — |
|  | Heat resistance | A | A | A | A | A | A | A | B | C | — | — |
|  | Amount of outgas (ppm) | 70 | 85 | 75 | 70 | 70 | 80 | 90 | 70 | 90 | — | — |
| Chemical resistance | Hydrofluoric acid/nitric acid/acetic acid mixed solution | A | A | A | A | A | A | A | A | A | — | — |
|  | 25% NaOH | A | A | A | A | A | A | A | A | A | — | — |
|  | Oil/fat cleaning agent | A | A | A | B | A | A | A | C | A | — | — |

As is clear from Table 7, the semiconductor containers obtained in Examples 3-1 to 3-7 had excellent heat resistance and chemical resistance. Moreover, the semiconductor containers of Examples 3-1 to 3-7 had an outgas amount of 90 ppm or less and excellent cleanliness. Therefore, the probability of a wafer or the like being contaminated when the wafer or the like is housed in any of these semiconductor containers is low.

In particular, by comparing Example 3-1 and Example 3-4 with reference to Table 7, it can be seen that the degree of crystallinity of the obtained semiconductor container (shaped product) could be increased and chemical resistance could be improved by using a mold having a higher temperature.

On the other hand, it can be seen from Table 7 that the semiconductor container of Comparative Example 3-1 had poor chemical resistance and heat resistance compared to the semiconductor containers of Examples 3-1 to 3-7 as a consequence of containing an amorphous alicyclic structure-containing resin.

It can also be seen from Table 7 that although the semiconductor container of Comparative Example 3-2 was crystalline, the semiconductor container had poor heat resistance compared to the semiconductor containers of Examples 3-1 to 3-7. By referring to Tables 3 and 6, it can be seen that the semiconductor container of Comparative Example 3-2 is a shaped item of the shaping material (3-7), which contained the alicyclic structure-containing resin (E) having a melting point of 140° C. and a glass-transition temperature of −5° C. Therefore, the cause of low heat resistance of the semiconductor container of Comparative Example 3-2 is thought to be that although the alicyclic structure-containing resin (E) is crystalline, it has a low melting point (140° C.) and a low glass-transition temperature (−5° C.).

Moreover, it can be seen with reference to Comparative Example 3-3 in Table 7 that the shaping material (3-8) containing an alicyclic structure-containing resin (F) for which a purification step had not been performed had a high content of chlorobenzene-soluble components. In the production process of the alicyclic structure-containing resin (F), an operation of drying under reduced pressure at 40° C. for 40 hours was performed both at a point at which the ring-opened polymer was obtained and a point after hydrogenation was completed. However, the value for the amount of chlorobenzene-soluble components shown in Table 7 indicates that the amount of chlorobenzene-soluble components in the shaping material could not be sufficiently reduced through this operation of drying under reduced pressure. On the other hand, it can be seen with reference to Example 3-7 in Table 7 that when the shaping material (3-9) containing an alicyclic structure-containing resin (F) for which a purification step had been performed was used, a semiconductor container having a small amount of outgas and excellent heat resistance and chemical resistance was obtained.

Furthermore, it can be seen with reference to Comparative Example 3-4 in Table 7 that the shaping material (3-10) containing an alicyclic structure-containing resin (A) for which a purification step had not been performed had a high content of chlorobenzene-soluble components.

INDUSTRIAL APPLICABILITY

According to the present disclosure, it is possible to provide a shaping material that contains a high-melting point resin and has excellent formability.

Moreover, according to the present disclosure, it is possible to provide a resin shaped product, a cosmetic container, and a semiconductor container that are obtained through shaping of a shaping material that contains a high-melting point resin and has excellent formability.

Furthermore, according to the present disclosure, it is possible to provide a method of producing the aforementioned semiconductor container.

The invention claimed is:

1. A shaping material comprising a crystalline alicyclic structure-containing resin, wherein
   the crystalline alicyclic structure-containing resin has a melting point of 200° C. or higher, and
   content of chlorobenzene-soluble components in the shaping material is 1,000 ppm or less as an o-dichlorobenzene-equivalent value based on gas chromatography analysis with o-dichlorobenzene as a standard substance.

2. The shaping material according to claim 1, wherein the crystalline alicyclic structure-containing resin is a hydrogenated dicyclopentadiene ring-opened polymer.

3. A resin shaped product obtained through melt shaping of the shaping material according to claim 1.

4. A cosmetic container that is a shaped item of the shaping material according to claim 1.

5. A semiconductor container that is a shaped item of the shaping material according to claim 1.

6. The semiconductor container according to claim 5, having a degree of crystallinity of 10% or more.

7. A method of producing the shaping material according to claim 1, the method comprising:
- a purification step of holding a target resin including a crystalline alicyclic structure-containing resin having a melting point Tm (° C.) of 200° C. or higher in a purification temperature range of not lower than 140° C. and not higher than 300° C. for not less than 0.5 hours and not more than 100 hours to obtain a purified target resin; and
- a shaping step of heating a pre-crystallization shaping material including the purified target resin to a higher temperature than the melting point Tm (° C.) to melt the pre-crystallization shaping material and subsequently shaping the pre-crystallization shaping material while holding the pre-crystallization shaping material in a crystallization temperature range of not lower than (Tm−140)° C. and lower than the melting point Tm (° C.) to cause crystallization.

8. The method according to claim 7, wherein content of chlorobenzene-soluble components in the pre-crystallization shaping material used in the shaping step is 1,000 ppm or less as an o-dichlorobenzene-equivalent value based on gas chromatography analysis with o-dichlorobenzene as a standard substance.

* * * * *